United States Patent
Hagiwara et al.

(10) Patent No.: US 7,640,150 B2
(45) Date of Patent: Dec. 29, 2009

(54) METHOD OF JUDGING THE PROPRIETY OF A POSITIVE ELECTRODE ACTIVE MATERIAL

(75) Inventors: Kazunari Hagiwara, Shizuoka (JP); Soichiro Kawakami, Nara (JP); Katsuhiko Inoue, Fukui (JP); Nobuyuki Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/324,443

(22) Filed: Nov. 26, 2008

(65) Prior Publication Data
US 2009/0157339 A1    Jun. 18, 2009

Related U.S. Application Data

(62) Division of application No. 10/871,813, filed on Jun. 21, 2004.

(30) Foreign Application Priority Data
Jun. 24, 2003    (JP) ............................. 2003-179397

(51) Int. Cl.
*G06F 11/50*    (2006.01)
*H01M 4/52*    (2006.01)
(52) U.S. Cl. .................. 703/12; 702/82; 423/594.4; 423/594.6; 429/231.3
(58) Field of Classification Search .................. None
See application file for complete search history.

(56) References Cited
U.S. PATENT DOCUMENTS
5,084,366 A    1/1992    Toyoguchi
(Continued)

FOREIGN PATENT DOCUMENTS
JP    3-219571    9/1991
(Continued)

OTHER PUBLICATIONS

H. Adachi, et al., "Discrete Variational Xa Cluster Calculations. I. Application to Metal Clusters", Journal of the Physical Society of Japan, vol. 45, No. 3, Sep. 1978, pp. 875-883.

(Continued)

*Primary Examiner*—Jonathan Crepeau
*Assistant Examiner*—Tony Chuo
(74) *Attorney, Agent, or Firm*—Fitzpatrick, Cella, Harper & Scinto

(57) ABSTRACT

An electrode material for a lithium secondary battery which includes particles each having a central portion and a surface portion covering the surface of the central portion. The central portion occupies 80 to 99% of a distance from a center to an outermost surface of the particle and the surface portion occupies 20 to 1% of the distance. The central portion includes $LiM_{1-a}D_aO_2$ (M represents Co or Ni, D represents a transition metal element or Al replacing a part of Co or Ni as M, and M is not the same as D) having an $\alpha$-$NaFeO_2$ structure. The surface portion includes $LiM_{1-b}E_bO_2$ (M represents Co or Ni, E represents a metal element replacing a part of Co or Ni as M, and M is not the same as E) having an $\alpha$-$NaFeO_2$ structure. The content of element E in the central portion satisfies the relation of $E/(M+D+E)<0.05$ in terms of an atomic ratio, and the content of element D in the surface portion satisfies the relation of $D/(M+D+E)<0.05$ in terms of an atomic ratio.

5 Claims, 8 Drawing Sheets

U.S. PATENT DOCUMENTS

| | | | |
|---|---|---|---|
| 5,491,037 A | 2/1996 | Kawakami | |
| 5,641,591 A | 6/1997 | Kawakami et al. | |
| 5,658,689 A | 8/1997 | Kawakami et al. | |
| 5,667,596 A | 9/1997 | Tsuzuki et al. | |
| 5,679,176 A | 10/1997 | Tsuzuki et al. | |
| 5,681,394 A | 10/1997 | Suzuki | |
| 5,698,339 A | 12/1997 | Kawakami et al. | |
| 5,702,845 A | 12/1997 | Kawakami et al. | |
| 5,728,482 A | 3/1998 | Kawakami et al. | |
| 5,800,939 A | 9/1998 | Mishina et al. | |
| 5,824,434 A | 10/1998 | Kawakami et al. | |
| 5,882,811 A | 3/1999 | Kawakami | |
| 5,888,666 A | 3/1999 | Kawakami | |
| 5,919,589 A | 7/1999 | Kawakami et al. | |
| 5,998,063 A | 12/1999 | Kobayashi et al. | |
| 6,051,340 A | 4/2000 | Kawakami et al. | |
| 6,063,142 A | 5/2000 | Kawakami et al. | |
| 6,106,562 A * | 8/2000 | Teter et al. | 703/12 |
| 6,165,642 A | 12/2000 | Kawakami et al. | |
| 6,329,096 B2 | 12/2001 | Kawakami et al. | |
| 6,372,387 B1 | 4/2002 | Kawakami et al. | |
| 6,377,030 B1 | 4/2002 | Asao et al. | |
| 6,432,585 B1 | 8/2002 | Kawakami et al. | |
| 6,475,664 B1 | 11/2002 | Kawakami et al. | |
| 6,517,974 B1 | 2/2003 | Kobayashi et al. | |
| 6,558,847 B1 | 5/2003 | Kawakami et al. | |
| 6,558,848 B1 | 5/2003 | Kobayashi et al. | |
| 6,569,568 B2 | 5/2003 | Kobayashi et al. | |
| 6,596,432 B2 | 7/2003 | Kawakami et al. | |
| 6,638,322 B1 | 10/2003 | Kawakami et al. | |
| 6,649,304 B2 | 11/2003 | Tani et al. | |
| 6,730,434 B1 | 5/2004 | Kawakami et al. | |
| 6,835,332 B2 | 12/2004 | Yamamoto et al. | |
| 6,902,845 B2 | 6/2005 | Tani et al. | |
| 6,924,059 B1 | 8/2005 | Kawakami et al. | |
| 6,932,955 B2 | 8/2005 | Yamamoto et al. | |
| 6,949,312 B1 | 9/2005 | Kawakami et al. | |
| 7,018,741 B2 | 3/2006 | Suhara et al. | |
| 7,141,187 B2 | 11/2006 | Kosuzu et al. | |
| 7,190,171 B2 | 3/2007 | Kawakami et al. | |
| 7,378,189 B2 | 5/2008 | Hagiwara et al. | |
| 2002/0110518 A1 | 8/2002 | Okuda et al. | |
| 2004/0175618 A1 | 9/2004 | Inoue et al. | |
| 2004/0191630 A1 | 9/2004 | Kawamura et al. | |
| 2005/0019668 A1 | 1/2005 | Yamamoto et al. | |

FOREIGN PATENT DOCUMENTS

| | | |
|---|---|---|
| JP | 4-188571 | 7/1992 |
| JP | 8-138670 | 5/1996 |
| JP | 8-222219 | 8/1996 |
| JP | 8-250120 | 9/1996 |
| JP | 10-236826 | 9/1998 |
| JP | 2004-127694 | 4/2004 |
| WO | 03/069702 | 8/2003 |

OTHER PUBLICATIONS

R. S. Mulliken, "Electronic Population Analysis on LCAO-MO Molecular Wave Functions. I", The Journal of Chemical Physics, vol. 23, No. 10, Oct. 1995, pp. 1833-1840.

* cited by examiner

METHOD OF JUDGING THE PROPRIETY OF A POSITIVE ELECTRODE ACTIVE MATERIAL

This application is a divisional of application Ser. No. 10/871,813, filed Jun. 21, 2004, the contents of which are incorporated herein by reference.

BACKGROUND OF THE INVENTION

1. Field of the Invention

The present invention relates to an electrode material for a lithium secondary battery, an electrode structure using the electrode material, and a lithium secondary battery using the electrode structure. Incidentally, the designation of groups of elements in the present claims and specification is in conformity with the designation adopted in the IUPAC Periodic Table.

2. Related Background Art

In these years, the amount of $CO_2$ gas contained in the atmosphere has been increasing, and there is an apprehension that the green house effect resulting therefrom leads to the global warming; thus, the countermeasure for reducing the exhaust amount of $CO_2$ gas is being investigated on a global scale. For example, a thermal power plant where a thermal energy obtained by burning fossil fuel is converted to an electric energy discharges a large amount of $CO_2$ gas, and accordingly, it has been becoming hardly possible to newly construct a thermal power plant. Under such circumstances, in order to meet the growing demand for electric power, the so-called load leveling has been proposed in which, as a measure for effective use of electric power, the load is leveled in such a way that the nighttime power, namely, the surplus power is stored in the batteries installed at homes and is used in the daytime where the power demand is large. On the other hand, automobiles that run using fossil fuel emit, in addition to $CO_2$ gas, $No_x$, $SO_x$, hydrocarbons and the like, and hence are considered to be problematic as another source of release of air pollutants. From the viewpoint of reducing the air pollutant release sources, electric automobiles that run by use of a motor driven with an electric power stored in a secondary battery do not emit air pollutants, thereby attract attention, and have been intensively investigated and developed for early practical application. Secondary batteries for use in the load leveling and in the electric automobiles are required to be high in energy density, long in operation lifetime and low in cost.

Furthermore, as for secondary batteries to be used in portable equipments such as notebook personal computers, word processors, video cameras, mobile phones and the like, early provision of those secondary batteries which are compact, lightweight and of high-performance is eagerly demanded.

Various types of high-performance secondary batteries corresponding to the above-described requirements have been proposed, some of which have come into practical use. A representative configuration of such practically applied lithium secondary batteries is such that carbon is used for the negative electrode material (negative electrode active material) constituting the negative electrode, a lithium cobalt composite oxide ($LiCoO_2$) is used for the positive electrode material (positive electrode active material) constituting the positive electrode, and an ethylene-carbonate-based electrolyte is used for the electrolyte. The lithium cobalt composite oxide ($LiCoO_2$) used as the positive electrode material has a drawback that it contains cobalt, which is a nonabundant resource, as its source material and is therefore expensive, but is regarded as having a highest practical value of the existing positive electrode materials (positive electrode active materials). This is mainly because no other alternatives to replace the lithium cobalt composite oxide have been provided yet. More specifically, for example, in contrast to the existing problem such that lithium nickel composite oxide ($LiNiO_2$) which is promising for attaining a high capacity and a high energy density and lithium manganese composite oxide ($LiMn_2O_4$) which uses abundant resource as source materials and is therefore inexpensive are difficult to synthesize and cause a lowering in capacity by repeating charging/discharging, the lithium cobalt composite oxide ($LiCoO_2$) is easily synthesized and shows a relatively small lowering in capacity even when repeating charging/discharging. Additionally, lithium nickel cobalt composite oxide ($LiNi_{1-x}Co_xO_2$) developed for the purpose of overcoming the above-described drawback of lithium nickel composite oxide ($LiNiO_2$) is still not sufficient in the characteristic of retention of capacity after repeated charging/discharging and is not therefore superior to the lithium cobalt composite oxide ($LiCoO_2$).

Incidentally, for the positive electrode material (positive electrode active material) used for the positive electrode of a lithium secondary battery, there have been proposed a large number of lithium/transition-metal composite oxides each comprising a crystal system composed of a plurality of different species of elements. For example, Japanese Patent Application Laid-Open No. H03-219571 discloses a positive electrode active material in which a part of Mn of $LiMn_2O_4$ is replaced (or substituted) with Co, Cr or Fe. Additionally, Japanese Patent Application Laid-Open No. H04-188571 discloses a positive electrode active material in which a part of Co of $LiCoO_2$ is replaced with Ti, V, Cr, Mo, Ni or Fe. Although the techniques involved in these applications are intended to improve the characteristics as the positive electrode active materials by substituting parts of the constituent elements of $LiMn_2O_4$ or $LiCoO_2$ with different species of elements, these positive electrode active materials cannot be said to be sufficient in the characteristic involved in the capacity retention after repeated charging/discharging.

Additionally, Japanese Patent Application Laid-Open No. H08-222219 discloses a positive electrode active material obtained by coating the surface of particles of a lithium/transition-metal composite oxide that is a positive electrode active material with $TiB_2$, TiC, TiN, $TiSi_2$, $Fe_3O_4$, $IrO_2$ or Au. Additionally, Japanese Patent Application Laid-Open No. H08-250120 discloses a positive electrode active material obtained by coating the surface of particles of a lithium/transition-metal composite oxide that is a positive electrode active material with $TiSe_2$, $TiTe_2$, $TiS_2$ or $MoS_2$. In these materials, by coating with a predetermined material the surface of the particles of the main positive electrode active material, it is intended to improve the characteristics of the surface of the particles of the positive electrode active material. However, even in such positive electrode active materials with the surface-coated structures, the characteristics involved in the capacity retention after repeated charging/discharging cannot be said to be sufficient.

$LiMO_2$ (M represents Co or Ni), which is a lithium/transition-metal composite oxide having the $\alpha$-$NaFeO_2$ structure, is evaluated to be useful as a positive electrode active material of a lithium secondary battery. However, $LiMO_2$ is liable to cause capacity degradation accompanying charging/discharging and particularly has a serious problem that repeated charging/discharging at a temperature as high as 60° C. leads to a greater capacity degradation, so that LiMO$_2$ is not considered to be worthy of practical use.

SUMMARY OF THE INVENTION

It is, therefore, an object of the present invention to provide a positive electrode active material, namely, a positive electrode material for a lithium secondary battery which has suppressed capacity degradation accompanying charging/discharging and exhibits excellent characteristics, by overcoming the above described problems and by taking advantage of the excellent characteristics of LiMO$_2$ having the α-NaFeO$_2$ structure.

It is another object of the present invention to provide an electrode structure and a lithium secondary battery, both using the above-mentioned positive electrode material.

The present inventors have conducted extensive theoretical and laboratory studies for the purpose of overcoming the above-described problems involved in LiMO$_2$ having the α-NaFeO$_2$ structure, and have consequently found that in a state where the Li of LiMO$_2$ (M represents Co or Ni) having the α-NaFeO$_2$ structure is missing, the bonding between the transition metal M and oxygen in the surface of the particles of the lithium/transition-metal composite oxide is weakened. Furthermore, the present inventors have found that by adopting the configuration such that particles of the above-described lithium/transition-metal composite oxide (positive electrode active material) each form a central portion; another lithium/transition-metal composite oxide covers the surface of the central portion to form a surface portion; a part of the transition metal element of the central portion is replaced with another transition metal element or Al; and a part of the transition metal element of the surface portion is replaced with a specific element, the bonding between the transition metal and oxygen in the surfaces of the particles of the positive electrode active material can be strengthened.

More specifically, the present inventors have found that with positive electrode active material particles each having a central portion and a surface portion covering (or coating) the surface of the central portion and having an average particle diameter of 0.1 to 10.0 μm, wherein the central portion occupies 80 to 99% of a distance from a center to an outermost surface of the particle and the surface portion occupies 20 to 1% of the distance; the central portion comprises LiM$_{1-a}$D$_a$O$_2$ (M represents Co or Ni, D represents a transition metal element or Al replacing a part of Co or Ni as M, and M is not the same as D) having an α-NaFeO$_2$ structure; the surface portion comprises LiM$_{1-b}$E$_b$O$_2$ (M represents Co or Ni, E represents a metal element replacing a part of Co or Ni as N, and M is not the same as E) having an α-NaFeO$_2$ structure; the content of element E in the central portion satisfies the relation of E/(M+D+E)<0.05 in terms of an atomic ratio; the content of element D in the surface portion satisfies the relation of D/(M+D+E)<0.05 in terms of an atomic ratio, because the species of replacing element D and the value a of the central portion thus differ from the species of replacing element E and the value b of the surface portion, respectively, the bonding between the transition metal and oxygen in the surfaces of the positive electrode active material particles is strong, the high-temperature storage characteristic is excellent and the cycle characteristic is high.

The present invention is based on the above-mentioned findings. More specifically, the present invention provides an electrode material for a lithium secondary battery comprising particles each having a central portion and a surface portion covering the surface of the central portion and having an average particle diameter of 0.1 to 10.0 μm, wherein the central portion occupies 80 to 99% of a distance from a center to an outermost surface of the particle and the surface portion occupies 20 to 1% of the distance, the central portion comprises LiM$_{1-a}$D$_a$O$_2$ (M represents Co or Ni, D represents a transition metal element or Al replacing a part of Co or Ni as M, and M is not the same as D) having an α-NaFeO$_2$ structure, the surface portion comprises LiM$_{1-b}$E$_b$O$_2$ (M represents Co or Ni, E represents a metal element replacing a part of Co or Ni as M, and M is not the same as E) having an α-NaFeO$_2$ structure, the content of element E in the central portion satisfies the relation of E/(M+D+E)<0.05 in terms of an atomic ratio, and the content of element D in the surface portion satisfies the relation of D/(M+D+E)<0.05 in terms of an atomic ratio; an electrode structure using the electrode material; and a lithium secondary battery using the electrode structure.

Incidentally, the term "lithium secondary battery" as herein employed is intended to encompass the so-called lithium-ion secondary battery.

DESCRIPTION OF THE PREFERRED EMBODIMENTS

The present inventors have conducted extensive theoretical and laboratory studies and consequently found that in a $LiMO_2$ (M represents Co or Ni) positive electrode active material having an $\alpha$-$NaFeO_2$ structure, when the lithium ions are released, namely, in a sate of charging, the M-O bonding force at the surfaces of the particles of the positive electrode active material is extremely decreased. It is believed that this makes the crystal structure unstable, and when charging/discharging is repeated, a structural change leading to electrochemical inactivity may be caused. Additionally, it is also believed that the above-described instability of the particle surface causes a reaction with moisture to cause decomposition of the oxygen at the surface, dissolution of the transition metal and the like. Furthermore, it is believed that the instability of the surface causes decomposition of an organic solvent and an electrolyte.

Figure 1:
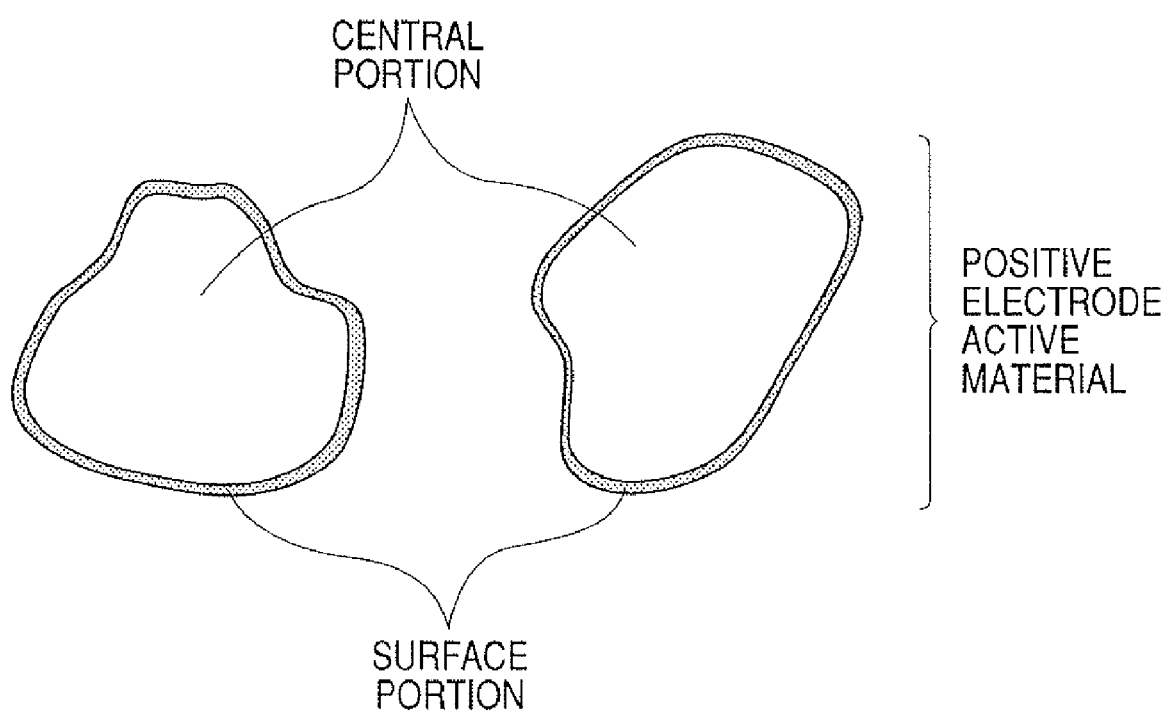
FIG. 1 is a schematic sectional view of one example of the positive electrode active material of the present invention comprising a central portion and a surface portion.

The present invention is a lithium secondary battery comprising a negative electrode, a separator, a positive electrode comprising a positive electrode active material capable of occluding/releasing lithium ions through charging/discharging, and an electrolyte as an ionic conductor, characterized in that as the positive electrode active material for the positive electrode, a lithium/transition-metal composite oxide is used in which the surface of the particle of the main constituent takes such configuration as shown in FIG. 1, so that the bonding between the transition metal and oxygen is strengthened, the crystal structure is stabilized and the surface is stabilized.

[Method of Calculating Bonding Force at Surface]

Figure 2:
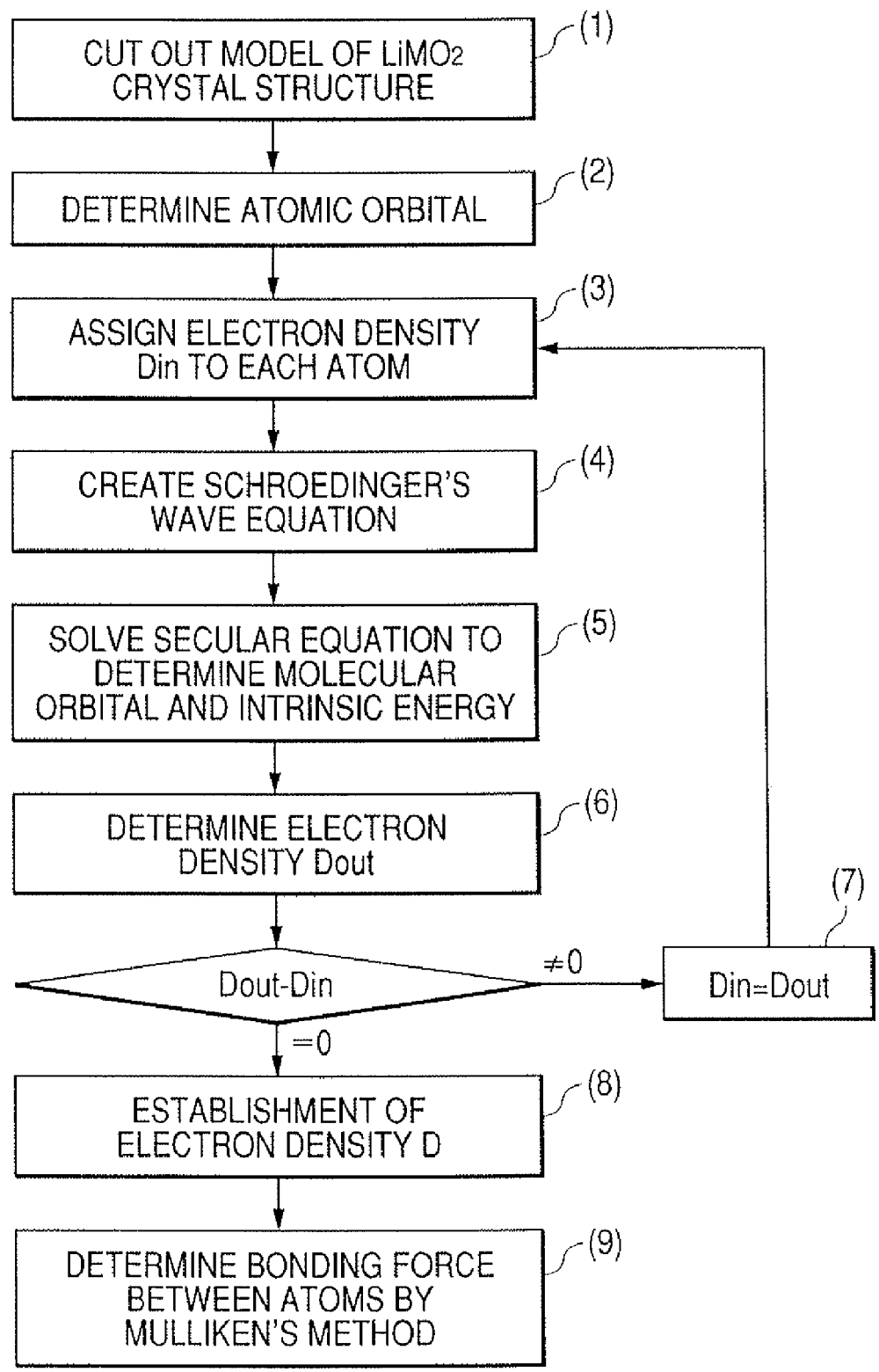
FIG. 2 shows a flow chart for explaining the procedure for calculating a bonding force at a surface.

The derivation of the bonding force is carried out using the method shown in the flow chart of FIG. 2. Detailed description will be made below on the method. The calculation method adopted is a density functional method described in a literature H. Adachi et al., J. Phys. Soc. Jpn., 45, 875 (1978).

Step 1:

[Model]

Figure 3:
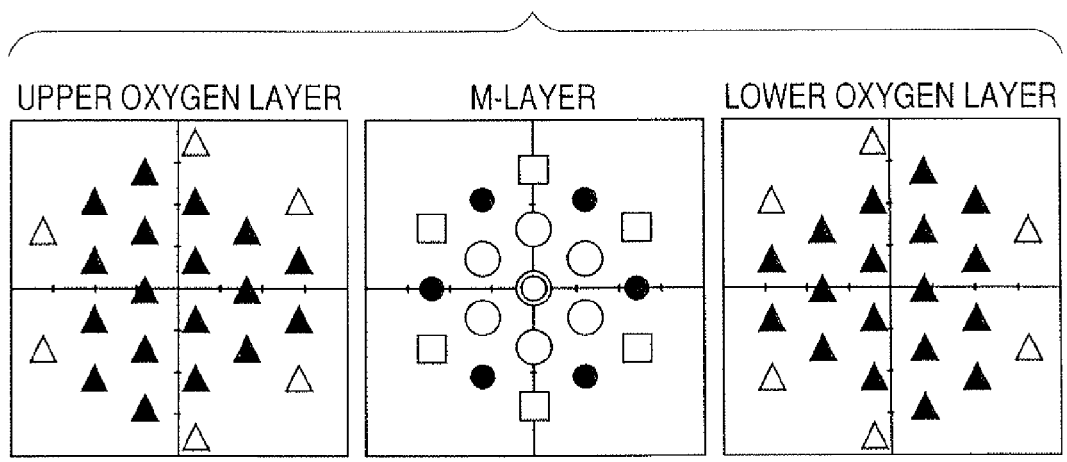
FIG. 3 shows an atomic aggregate model for LiCoO$_2$ or LiNiO$_2$ crystal in a state in which Li is released.

First, an atomic aggregate model adopted is described. The atomic aggregate model adopted is shown in FIG. 3. FIG. 3 shows a cut out part of $LiCoO_2$ or $LiNiO_2$ crystal in a state in which Li is released. In FIG. 3, $\Delta$ and $\blacktriangle$ stand for oxygen atoms, $\circ$ and $\square$ stand for M atoms, the central $\circledcirc$ represents a replacing atom in the central portion, and the peripheral $\bullet$ represents a replacing atom in the surface portion. The bonding of M-O at the surface was examined between oxygen atom represented by $\blacktriangle$ and M atom represented by $\square$.

[Validity of Model]

The model shown in FIG. 3 is a cluster model in which two oxygen layers sandwich one M-layer. The term "cluster model" as herein employed refers to an atomic aggregate model. In the case of an $\alpha$-$NaFeO_2$ type $LiMO_2$, Li-layers are present above and beneath the cluster. However, since it is assumed here that Li is released, a model is used in which Li is absent. Consequently, a configuration of [O-M-O], a space, [O-M-O], a space, ... actually arises. In this case, since the respective clusters of [O-M-O] are separated through the spaces from each other, the interaction involved in the bonding that is exerted across the spaces is sufficiently smaller as compared with the M-O bonding within [O-M-O], the state between atoms can sufficiently be represented using a cluster having a single O-M-O formed therein. Further, in the M-layer, the interior thereof is taken as the central portion of the cluster and the peripheral portion thereof is taken as the surface portion of the cluster. In this connection, since the interior portion and the peripheral portion are each equally allotted one oxygen layer above or beneath the portion concerned, it is conceivable that the both possibly represent the surface. However, because spaces in a state in which Li does not exist are actually present in the Li-released state, it is valid that the interior and the peripheral portions of a single M-layer are taken as the central and the surface portions of the cluster, respectively. Moreover, the number of atoms in the central portion of an actual electrode material particle is not one and numerous atoms exist therein. Therefore, also in the cluster model as employed herein, the number of atoms in the central portion should not be presumed to be one but should be presumed to be more than one. However, the model shown in FIG. 3 can be taken as valid for the purpose of investigating the change of the surface M-O bonding because the element in the central portion of the cluster affects the surface even when there is merely one element in the central portion.

[Calculation Method]

Now, detailed description will be made below on the calculation procedures.

(Unit System for Calculation Equations)

The unit system for the calculation equations is based on the atomic unit system. In other words, the quantities defined in the following equations (1) to (5) are each taken as 1.

Unit of Length: Bohr Radius $$a_o = \frac{h}{4\pi^2 me^2} = 0.529177 \times 10^{-10} \; [m] \qquad (1)$$

Unit of Charge: the Charge of a Proton $$e = 1.602177 \times 10^{-19} \; [C] \qquad (2)$$

Unit of Energy: the Electrostatic Energy Exerted Between Two Unit Charges Distant from Each Other by a Unit Length $$E_h = \frac{e^2}{a_0} = 27.211605 \; [eV] \qquad (3)$$

Unit of Mass: the Mass of an Electron $$m = 9.10939 \times 10^{-31} \; [kg] \qquad (4)$$

Unit of Time:

$$t_0 = \frac{h}{2\pi E_h} = 2.418885 \times 10^{-17} \; [s] \qquad (5)$$

Here, h represents the Planck constant ($6.626075 \times 10^{-34}$ [Js]), and the Bohr radius is a quantity used in the Bohr's hydrogen atom model.

Step 2:

[Calculation of Atomic Orbitals]

For the purpose of assigning the initial electron densities of the atoms to be used in the model, the orbital (atomic orbital $a_i(\vec{r_v})$) for an i-th electron at a position $\vec{r_v}$ of an isolated atom v and the intrinsic energy $\epsilon_i$ thereof are calculated. For that purpose, the Hamiltonian $h(\vec{r_v})$ given by the following equation (6) and the wave equation given by the following equation (7) are used.

Hamiltonian:

$$h(\vec{r_v}) = -\frac{1}{2}\nabla\frac{2}{r_v} - \frac{Z_v}{|\vec{r_v} - \vec{R_v}|} + \int \frac{D(\vec{r'})}{|\vec{r_v} - \vec{r'}|}dV' - 3\alpha\left\{\frac{3}{4\pi}D(\vec{r_v})\right\}^{\frac{1}{3}} \quad (6)$$

Wave Equation:

$$h(\vec{r_v}) \cdot a_i(\vec{r_v}) = \epsilon_i \cdot a_i(\vec{r_v}) \quad (7)$$

Here, $$\nabla^2 = \frac{\partial^2}{\partial x^2} + \frac{\partial^2}{\partial y^2} + \frac{\partial^2}{\partial z^2}$$

and the adscripts represent the coordinates with respect to which differentiation is carried out. $Z_v$ denotes the charge of an atomic nucleus, and $\vec{R_v}$ denotes the position of the atomic nucleus. $D(\vec{r})$ denotes the electron density at the position $\vec{r}$, and in the integration $dV=dxdydz$ and $\alpha=0.7$. The first, second, third and fourth terms on the right hand side of equation (6) represent respectively the kinetic energy of an electron, the potential energy exerted from the atomic nucleus, the potential energy for the electron system, and the exchange potential as a correction term.

Step 3:

[Assign Initial Electron Density to Model]

The initial electron density $D_{in}(\vec{r})$ is given as the sum of squares of the atomic orbitals $a_i(\vec{r})$, as shown in equation (8), $$D_{in}(\vec{r}) = \sum_i \{a_i(\vec{r})\}^2 \quad (8)$$

wherein the subscript i refers to all the electrons.

Step 4:

[Calculation of Molecular Orbital]

Here is adopted the LCAO (Linear Combination of Atomic Orbitals) method. This is a method in which a molecular orbital is represented by the linear combination of the atomic orbitals. More specifically, the molecular orbital at the position $\vec{r}$ of the l-th electron is represented by the following equation (9):

$$\phi_l(\vec{r}) = \sum_l C_{il} \cdot a_i(\vec{r}) \quad (9)$$

wherein $C_{il}$ is a constant. On the basis of the value of $C_{il}$ ($0 \leq C_{il} \leq 1$), an investigation can be made as to which atomic orbital greatly contributes to the molecular orbital. Using this relation, the molecular orbital $\phi_l(\vec{r})$ and the intrinsic energy $\epsilon_l$ thereof are calculated. For that purpose, the following Hamiltonian $h(\vec{r})$ given by equation (10) and wave equation given by equation (11) are used:

$$h(\vec{r}) = -\frac{1}{2}\nabla\frac{2}{r} - \sum_v \frac{Z_v}{|\vec{r} - \vec{R_v}|} + \int \frac{D_{in}(\vec{r'})}{|\vec{r} - \vec{r'}|}dV' - 3\alpha\left\{\frac{3}{4\pi}D_{in}(\vec{r})\right\}^{\frac{1}{3}} \quad (10)$$

$$h(\vec{r}) \cdot \phi_l(\vec{r}) = \epsilon_l \phi_l(\vec{r}) \quad (11)$$

wherein the first, second, third and fourth terms on the right hand side of equation (10) represent respectively the kinetic energy of an electron, the potential energy exerted from all nuclei in the system, the potential energy for the electron system, and the exchange potential as a correction term.

Step 5:

[Secular Equation]

Because solving the above-described wave equation (11) is equivalent to solving the secular equation, an equation of the element representation given by equation (12) or an equation in the matrix representation given by equation (15) is actually solved. The specific element representation is given by equation (12):

$$\text{Element representation: } \sum_i \sum_j (H_{ij} - \epsilon_i \cdot S_{ij}) \cdot C_{jl} = 0 \quad (12)$$

Wherein $H_{ij}$ and $S_{ij}$ are respectively given by equations (13) and (14):

$$H_{ij} = \int a_i^*(\vec{r}) \cdot h(\vec{r}) \cdot a_j(\vec{r}) dV \quad (13)$$

$$S_{ij} = \int a_i^*(\vec{r}) \cdot a_j(\vec{r}) dV \quad (14)$$

Further, the element representation given by equation (12) can be recast in the following form of equation (15) as the matrix representation:

$$\text{Matrix representation: } (\hat{H} - \hat{\epsilon} \cdot \hat{S}) \cdot \hat{C} = \hat{0} \quad (15)$$

wherein the ^ assigned above each character signifies that the character is a matrix.

By solving the secular equation, the molecular orbitals $\phi_l(\vec{r})$ and the associated intrinsic energies $\epsilon_l$ are obtained.

Step 6:

[Comparison Between Electron Densities Before and After Calculation]

From the sum of squares of the molecular orbitals $\phi_l(\vec{r})$, the electron density $D_{out}(\vec{r})$ after calculation is obtained and given by equation (16):

$$D_{out}(\vec{r}) = \sum_l \{\phi_l(\vec{r})\}^2 \quad (16)$$

Then, a difference Z between the electron density after the calculation and the electron density before the calculation is obtained from equation (17):

$$Z = D_{out}(\vec{r}) - D_{in}(\vec{r}) \quad (17)$$

Step 7:

When the electron density difference Z≠0, the electron density after the calculation is again set to replace the initially putted in electron density so as to be $D_{in}(\vec{r})=D_{out}(\vec{r})$ and the calculation goes back to Step 3.

Step 8:

When Z=0, the final electron density is determined to be $D_{end}(\vec{r})=D_{out}(\vec{r})$, and the molecular orbital $\phi_l(\vec{r})$ and the intrinsic energy $\epsilon_l$ thereof at that time are obtained.

Step 9:

[Calculation of Bonding Force]

The bonding force between a particular atom A and a particular atom B is calculated. Here, the bonding force represents the strength of covalent bondability. The adopted calculation method is the Mulliken's method (Mulliken, R. S., J. Chem. Phys., 23, 1833-1846 (1955)), and the following calculation equation (18) is used.

Bonding force between atoms A and B:

$$Q_{AB} = \sum_{\substack{i \in A \\ j \in B}} \left( \sum_l f_l \cdot C_{il} \cdot C_{jl} \cdot S_{ij} \right) \quad (18)$$

wherein $f_l$ represents the occupation number of electrons occupying the molecular orbital l. Further, the summations for i and j are carried out only for terms associated with the atoms A and B, respectively. On the basis of the magnitude of $Q_{AB}$, the strength of the bonding force is evaluated.

[Calculation Results of Bonding Force at Surface]

Figure 4:
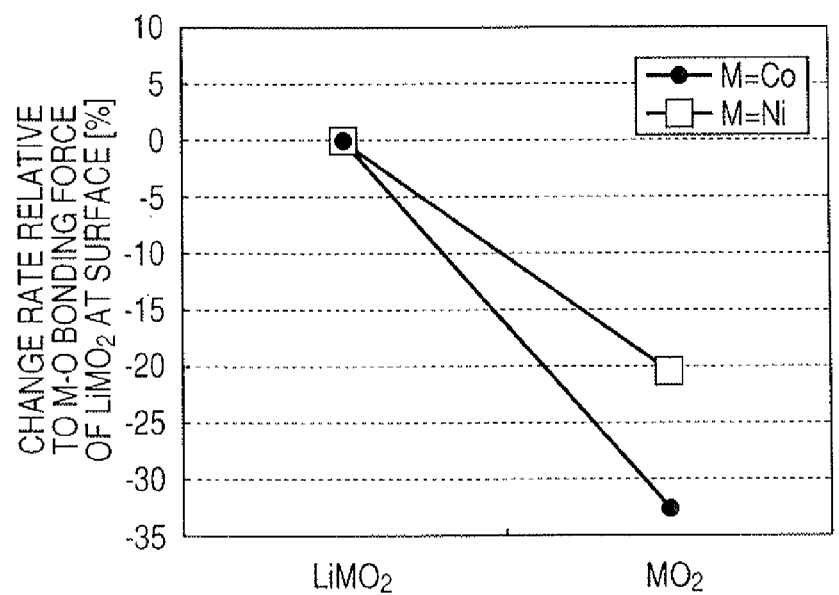
FIG. 4 is a graphical representation showing a change in M-O bonding force at surfaces of LiMO$_2$ and MO$_2$.

FIG. 4 shows a rate of change in the M-O bonding force of the surface depending on the presence/absence of Li in $LiMO_2$ (change rate of bonding force [%]=Bonding force at the surface/Bonding force at the surface for $LiMO_2×100$). It has been seen that in both cases of M=Co and of M=Ni, the bonding force is weakened in the state in which Li is released. This is considered to be a factor for the phenomena including the structural instability occurring when charging/discharging is repeated for a lithium secondary battery using $LiMO_2$ having the α-$NaFeO_2$ structure for the positive electrode, and the dissolving out of metallic ions occurring when the same battery is stored at high temperatures of 60° C. or more.

Figure 5:
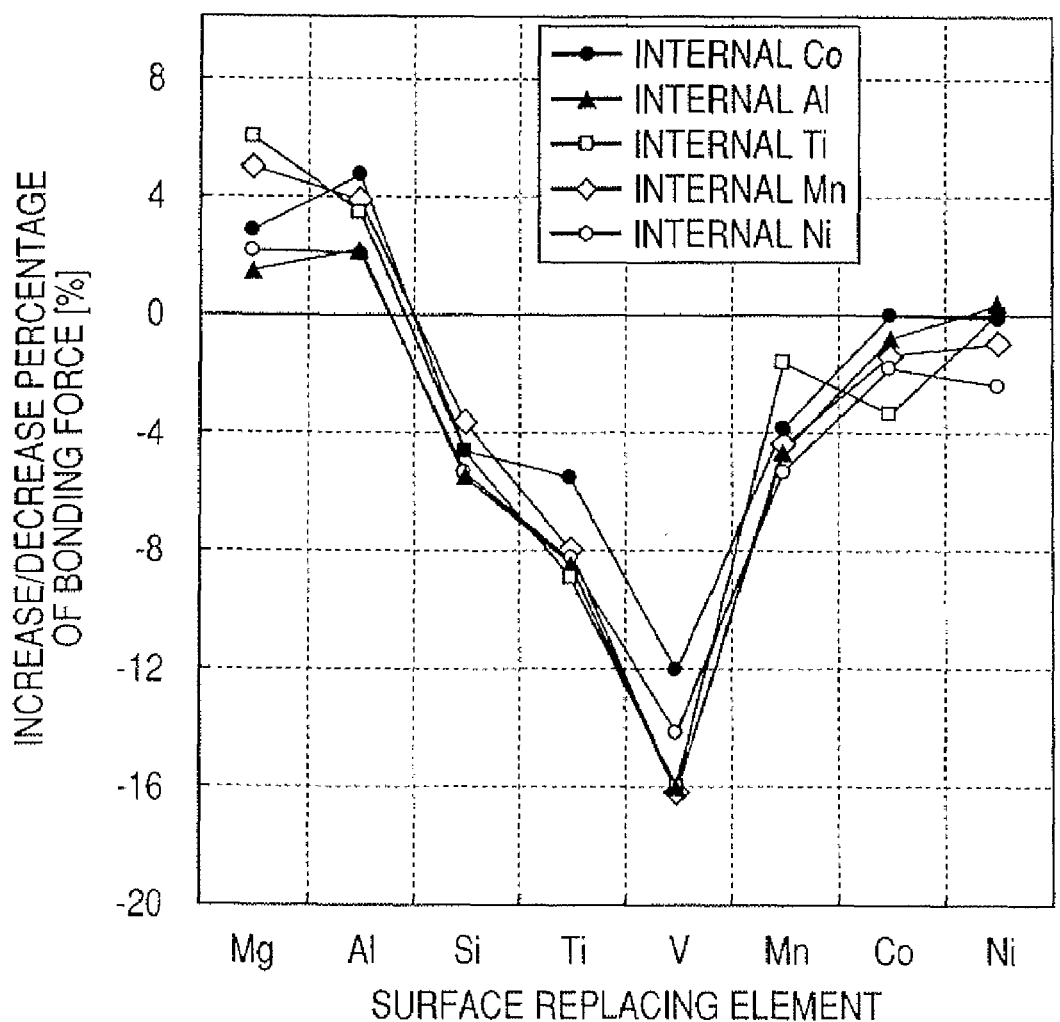
FIG. 5 is a graphical representation showing increase/decrease percentages of Co—O bonding force at a surface where in the case of M=Co, internal Co atoms are replaced by Al, Ti, Mn or Ni, and a part of surface Co atoms is replaced by other elements (increase/decrease percentage (%)={(Co—O bonding force when surface and internal elements are replaced)−(Co—O bonding force at surface when replacement is not effected at all)}/(Co—O bonding force at surface when replacement is not effected at all)×100 with the increase/decrease percentage of the Co—O bonding force at surface when replacement is not effected at all being 0%)

FIG. 5 is a graphical representation showing increase/decrease percentages of Co—O bonding force at a surface where in the case of M=Co, internal Co atoms are replaced by Al, Ti, Mn or Ni, and a part of surface Co atoms is replaced by other elements (increase/decrease percentage (%)={(Co—O bonding force when surface and internal elements are replaced)−(Co—O bonding force at surface when replacement is not effected at all)}/(Co—O bonding force at surface when replacement is not effected at all)×100 with the increase/decrease percentage of the Co—O bonding force at surface when replacement is not effected at all being 0%), with the abscissa representing the surface replacing elements. It has been found from FIG. 5 that the elements strengthening the Co—O bonding force are the elements belonging to Groups 2 and 13 of the periodic table, more preferably Al and Mg.

Figure 6:
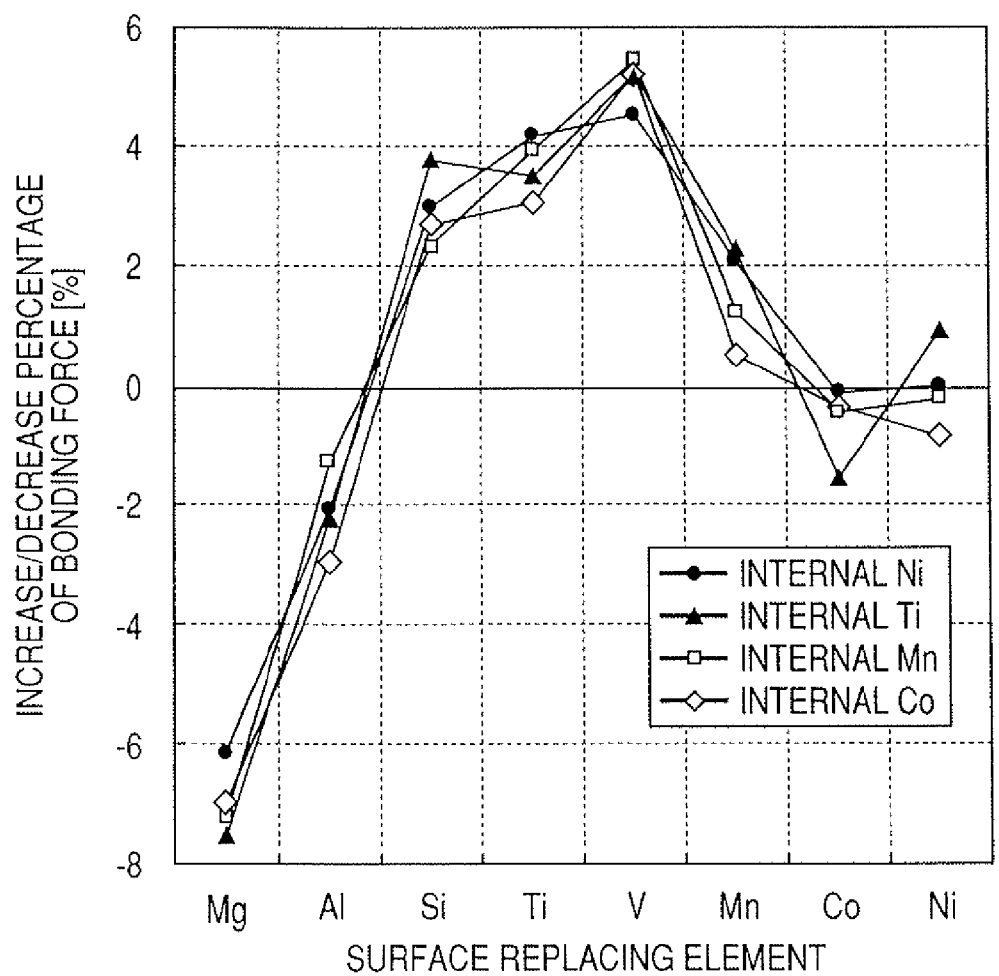
FIG. 6 is a graphical representation showing increase/decrease percentages of Ni—O bonding force at a surface where in the case of M=Ni, internal Ni atoms are replaced by Ti, Mn or Co, and a part of surface Ni atoms is replaced by other elements (increase/decrease percentage (%)={(Ni—O bonding force when surface and internal elements are replaced)−(Ni—O bonding force at surface when replacement is not effected at all)}/(Ni—O bonding force at surface when replacement is not effected at all)×100 with the increase/decrease percentage of the Ni—O bonding force at surface when replacement is not effected at all being 0%)

Further, FIG. 6 is a graphical representation showing increase/decrease percentages of Ni—O bonding force at a surface where in the case of M=Ni, internal Ni atoms are replaced by Ti, Mn or Co, and a part of surface Ni atoms is replaced by other elements (increase/decrease percentage (%)={(Ni—O bonding force when surface and internal elements are replaced)−(Ni—O bonding force at surface when replacement is not effected at all)}/(Ni—O bonding force at surface when replacement is not effected at all)×100 with the increase/decrease percentage of the Ni—O bonding force at surface when replacement is not effected at all being 0%), with the abscissa representing the surface replacing elements. It has been found from FIG. 6 that the elements strengthening the Ni—O bonding force are the elements belonging to Groups 4, 5 and 14 of the periodic table, more preferably V and Si.

[Positive Electrode Active Material]

The positive electrode active material (positive electrode active material particles) is characterized by comprising positive electrode active material particles each having a central portion and a surface portion covering the surface of the central portion and having an average particle diameter of 0.1 to 10.0 μm, wherein the central portion occupies 80 to 99% of a distance from a center to an outermost surface of the particle and the surface portion occupies 20 to 1% of the distance; the central portion comprises $LiM_{1-a}D_aO_2$ (M represents Co or Ni, D represents a transition metal element or Al replacing a part of Co or Ni as N, and M is not the same as D) having an α-$NaFeO_2$ structure; the surface portion comprises $LiM_{1-b}E_bO_2$ (M represents Co or Ni, E represents a metal element replacing a part of Co or Ni as M, and M is not the same as E) having an α-$NaFeO_2$ structure; the content of element E in the central portion satisfies the relation of E/(M+D+E)<0.05 in terms of an atomic ratio; the content of element D in the surface portion satisfies the relation of D/(M+D+E)<0.05 in terms of an atomic ratio; and the species of replacing element D and the value a of the central portion differ from the species of replacing element E and the value b of the surface portion, respectively.

When the average particle diameter of the positive electrode material particles falls is more than 10.0 μm, the packing density of the positive electrode active material in an electrode material layer is decreased to be liable to cause a lowering in the battery capacity, and additionally, the specific surface area is decreased to be liable to cause a lowering in the high-rate discharging performance. When the average particle diameter of the positive electrode material particles is less than 0.1 μm, the contact resistance between the particles is increased to increase the electrode resistance, so that a lowering of the high-rate discharging performance tends to be caused. For these reasons, it is preferable that the average particle diameter of the positive electrode active material particles is 0.1 to 10.0 μm. The configuration that the central portion occupies 80 to 99% of the distance from the center to the outermost surface of the particle and the surface portion occupies 20 to 1% of the distance has been adopted on the basis of the results obtained through experiments. When the proportion occupied by the central portion is more than 99% of the distance from the particle center to the particle outermost surface, the surface portion is too thin and will not cover a part of the uneven surface of the particle. When the proportion occupied by the central portion is less than 80% of the distance from the particle center to the particle outermost surface, the surface portion is too thick and hence a lowering in the charge/discharge capacity tends to be caused and a lowering in the capacity with increasing cycle number tends to occur.

When the content of the element E in the central portion is E/(M+D+E)≧0.05 in terms of an atomic ratio, the effect of the element E is exerted to the central portion to cause a lowering in the capacity, and hence it is preferable that the content of the element E in the central portion satisfies the relation of E/(M+D+E)<0.05 in terms of an atomic ratio. Further, when the content of the element D in the surface portion is D/(M+D+E)≧0.05 in terms of an atomic ratio, the effect of the element D is exerted to the surface portion to cause a lowering in the capacity, and hence it is preferable that the content of the element D in the surface portion satisfies the relation D/(M+D+E)<0.05 in terms of an atomic ratio. Additionally, for the purpose of sufficiently covering the central portion having the uneven surface of each of the positive electrode active material particles without leaving any uncovered portions, it is preferable that the thickness of the surface portion is 0.01 µm or more. Additionally, for the purpose of practically eliminating the effect of the element E in the central portion leading to the lowering in capacity, it is preferable that the content of the element E in the central portion satisfies the relation of E/(M+D+E)<0.01 in terms of an atomic ratio. Similarly, for the purpose of practically eliminating the effect of the element D in the central portion leading to the lowering in capacity, it is preferable that the content of the element D in the surface portion satisfies the relation of D/(M+D+E)<0.01 in terms of an atomic ratio.

It is preferable that M of $LiM_{1-a}D_aO_2$ in the central portion and of $LiM_{1-b}E_bO_2$ in the surface portion is Co, and replacing element D in the central portion is at least one element selected from the group consisting of Al, Ti, Mn, and Ni. In this case, it is preferable that the range of a is 0.01<a<0.25, replacing element E in the surface portion is at least one element selected from the group consisting of the elements belonging to Groups 2 and 13 of the periodic table, and the range of b is 0.01<b<0.25. In this connection, when a is 0.25 or more, the $\alpha$-NaFeO$_2$ structure cannot be maintained, the structure becomes thereby extremely unstable, and a lowering in capacity at an initial stage or a lowering in capacity after repeated cycles tends to be caused, while when a is 0.01 or less, the effect for suppressing the lowering in capacity caused by repeated cycles can not be sufficiently obtained. Similarly, when b is 0.25 or more, the $\alpha$-NaFeO$_2$ structure cannot be maintained or the structure becomes extremely unstable, and a lowering in capacity at an initial stage or a lowering in capacity after repeated cycles tends to be caused, while when b is 0.01 or less, the effect for suppressing the lowering in capacity caused by repeated cycles can not be sufficiently obtained.

As a preferred example of the positive electrode active material particle comprising the above described central and surface portions, there is included a positive electrode active material particle in which M of $LiM_{1-a}D_aO_2$ in the central portion and of $LiM_{1-b}E_bO_2$ in the surface portion is Co, replacing element D in the central portion comprises at least element selected from the group consisting of Al, Ti, Mn, and Ni, the range of a is 0.01<a<0.25, replacing element E in the surface portion comprises at least one of Al and Mg, and the range of b is 0.01<b<0.25. In this case, when a is 0.25 or more, the $\alpha$-NaFeO$_2$ structure cannot be maintained or the structure becomes extremely unstable, and a lowering in capacity at an initial stage or a lowering in capacity after repeated cycles tends to be caused, while when a is 0.01 or less, the effect for suppressing the lowering in capacity caused by repeated cycles can not be sufficiently obtained. Similarly, when b is 0.25 or more, the $\alpha$-NaFeO$_2$ structure cannot be maintained or the structure becomes extremely unstable, and a lowering in capacity at an initial stage or a lowering in capacity after repeated cycles tends to be caused, while when b is 0.01 or less, the effect for suppressing the lowering in capacity caused by repeated cycles can not be sufficiently obtained.

As another preferred example of the positive electrode active material particle comprising the above described central and surface portions, there is included a positive electrode active material particle in which M of $LiM_{1-a}D_aO_2$ in the central portion and of $LiM_{1-b}E_bO_2$ in the surface portion is Ni, replacing element D in the central portion comprises at least element selected from the group consisting of Ti, Co and Mn, the range of a is 0.01<a<0.25, replacing element E in the surface portion comprises at least one of the elements belonging to Groups 4, 5 and 14 of the periodic table, and the range of b is 0.01<b<0.25. In this case, when a is 0.25 or more, the $\alpha$-NaFeO$_2$ structure cannot be maintained or the structure becomes extremely unstable, and a lowering in capacity at an initial stage or a lowering in capacity after repeated cycles tends to be caused, while when a is 0.01 or less, the effect for suppressing the lowering in capacity caused by repeated cycles can not be sufficiently obtained. Similarly, when b is 0.25 or more, the $\alpha$-NaFeO$_2$ structure cannot be maintained or the structure becomes extremely unstable, and a lowering in capacity at an initial stage or a lowering in capacity after repeated cycles tends to be caused, while when b is 0.01 or less, the effect for suppressing the lowering in capacity caused by repeated cycles can not be sufficiently obtained.

As still another preferred example of the positive electrode active material particle comprising the above described central and surface portions, there is included a positive electrode active material particle in which M of $LiM_{1-a}D_aO_2$ in the central portion and of $LiM_{1-b}E_bO_2$ in the surface portion is Ni, replacing element D in the central portion comprises at least element selected from the group consisting of Ti, Co and Mn, the range of a is 0.01<a<0.25, replacing element E in the surface portion comprises at least one of V and Si, and the range of b is 0.01<b<0.25. In this case, when a is 0.25 or more, the $\alpha$-NaFeO$_2$ structure cannot be maintained or the structure becomes extremely unstable, and a lowering in capacity at an initial stage or a lowering in capacity after repeated cycles tends to be caused, while when a is 0.01 or less, the effect for suppressing the lowering in capacity caused by repeated cycles can not be sufficiently obtained. Similarly, when b is 0.25 or more, the $\alpha$-NaFeO$_2$ structure cannot be maintained or the structure becomes extremely unstable, and a lowering in capacity at an initial stage or a lowering in capacity after repeated cycles tends to be caused, while when b is 0.01 or less, the effect for suppressing the lowering in capacity caused by repeated cycles can not be sufficiently obtained.

It is preferable that the interface between the central portion and the surface portion of the above-described positive electrode active material particle is in a state in which atoms are not merely in physical contact with each other but are chemically bonded to each other, the concentration of replacing element D in the central portion and the concentration of replacing element E in the surface portion vary as functions of the distance from the center of the particle, and more preferably in the central portion the concentration of replacing element D is decreased as approaching the interface between the central portion and the surface portion, while in the surface portion the concentration of replacing element decreased as approaching the interface between the central portion and the surface portion.

[Source Materials for Lithium, Source Materials for Element M]

As the source materials for lithium, lithium metal, and salts, oxides, hydroxide, nitride, sulfide, halides, organometallic compounds and the like of lithium are used, but the source materials for lithium are not limited to these. As the source materials for element M (Co or Ni), metals, salts, oxides, hydroxides, nitrides, sulfides, halides, organometallic compounds and the like of these elements are used, but the source materials for the element M are not limited to these cited.

Representative examples of the lithium salts and the salts of element M include carbonates, nitrates, sulfates, sulfaminates, acetates, oxalates, citrates, tartrates, formates and ammonium salts.

[Source Materials for Element D (Transition Metal Elements, Aluminum Element)]

As the source materials for the transition metals, the metals of the transition metal elements (transition metals), and salts, oxides, hydroxides, nitrides, sulfides, halides, organo transition metal compounds and the like of the transition metal elements are used, but the source materials for the transition metals are not limited to these. As the source materials for aluminum element, aluminum metal, and salts, oxide, hydroxide, nitride, sulfide, halides, organo transition metal compounds and the like of aluminum are used, but the source materials for the aluminum element are not limited to these cited. Examples of the transition metal elements for the above described transition metals and transition metal compounds are those having a partially filled d- or f-shell and include Ti, Zr, V, Nb, Cr, Mo, W, Mn, Fe, Co, Ni, Pd, Pt, Cu, Ag, Au and Zn. Among these preferable are the first row transition metals, Ti, V, Cr, Mn, Fe, Co, Ni and Cu.

Representative examples of the above-described salts of element D include carbonates, nitrates, sulfates, sulfaminates, acetates, oxalates, citrates, tartrates, formates and ammonium salts.

[Source Materials for Element E]

As the source materials for the element E, the metal of the element concerned, and salts, oxide, hydroxide, nitride, sulfide, halides, organometallic compounds and the like of the element concerned are used, but the source materials for the element E are not limited these cited.

[Method of Forming Positive Electrode Active Material Particles]

As the method of forming the central portion and the surface portion of the positive electrode particle, there may be included a method of baking on the surface by calcination, a method of chemically treating the surface of the active material, a method of electrochemically depositing on the surface of the active material, a method of coating the surface of the active material by vapor deposition, a method of strongly binding the central portion and the surface portion by applying a mechanical energy to an active material fine powder with the aid of a ball mill or the like, and methods based on combination of two or more of these methods.

Particularly, there is preferably included a method in which after a material constituting the central portion is synthesized, a material constituting the surface portion is coated by a wet process uniformly on the surface of the central portion material, and then a part of the material constituting the surface portion is diffused inwardly by calcination into a region within a range of 80% or more of the distance from the center of the central portion to the outermost surface. Specifically, a method can be mentioned as a preferable example in which a preliminarily synthesized material for constituting the central portion is dispersed in an organic solvent having a material (e.g., a prescribed salt) for constituting the surface portion dissolved therein in a predetermined concentration, then the organic solvent is evaporated while the central portion constituting material remains dispersed therein, thus a dried precursor is prepared in which the material constituting the central portion is coated uniformly with the salt constituting the surface portion in a predetermined proportion, and the precursor is calcined to obtain the objective particles. However, the preferable method is not limited thereto.

[Source Material for Use in Wet Process]

As the material to be added to an organic solvent for the purpose of forming the above-described surface portion, for example, the metals, salts, oxides, hydroxides, nitrides, sulfides, halides and organometallic compounds of the above-described elements can be used. For the purpose of uniform coating, preferably, nitrates, sulfates and organometallic compounds soluble in organic solvents such as alcohols are desirable.

As the above-mentioned organometallic compounds, alkoxides, acetylacetonates, octylates, naphthenates and the like of metallic elements can be used. Specific examples of such alkoxides include $Mn(OC_2H_5)_2$, $Mn(OC_3H_7)_2$, $Mn(OC_4H_9)_2$, $Ni(OC_2H_5)_2$, $Ni(OC_3H_7)_2$, $Ni(OC_4H_9)_2$, $Co(OC_2H_5)_2$, $Co(OC_3H_7)_2$, $Co(OC_4H_9)_2$, $Ti(OC_2H_5)_2$, $Ti(OC_3H_7)_2$, $Ti(OC_4H_9)_2$, $Fe(OC_2H_5)_2$, $Fe(OC_3H_7)_2$, $Fe(OC_4H_9)_2$, $Cu(OC_2H_5)_2$, $Cu(OC_3H_7)_2$, $Cu(OC_4H_9)_2$, $VO(OCH_3)_3$, $VO(OC_2H_5)_3$, $VO(OC_3H_7)_3$, $VO(OC_4H_9)_3$, $Y(OC_4H_9)_3$, $Li(OCH_3)$, $Zn(OC_2H_5)_2$, $Si(OCH_3)_4$, $Si(OC_2H_5)_4$, $Si(OC_3H_7)_4$, $Si(OC_4H_9)_4$, $Al(OCH_3)_3$, $Al(OC_2H_5)_3$, $Al(OC_3H_7)_3$ and $Al(OC_4H_9)_3$.

Specific examples of the above-mentioned acetylacetonates include $Cu(C_5H_7O_2)_2$, $Co(C_5H_7O_2)_2(H_2O)_2$, $Co(C_5H_7O_2)_3$, $Ni(C_5H_7O_2)_2(H_2O)_2$, $Mn(C_5H_7O_2)_2(H_2O)_2$, $Cr(C_5H_7O_2)_3$, $VO(C_5H_7O_2)_2$, $V(C_5H_7O_2)_3$, $Fe(C_5H_7O_2)_3$, $Zn(C_5H_7O_2)_2$, $Ti(OC_4H_9)_2(C_5H_7O)_2$, $La(C_5H_7O_2)_3$, $Y(C_5H_7O_2)_3$ and $Zr(C_5H_7O_2)_4$.

Specific examples of the above-mentioned octylates include $Cu(C_7H_{15}COO)_2$, $Ni(C_7H_{15}COO)_2$, $Fe(C_7H_{15}COO)_3$, $Mn(C_7H_{15}COO)_2$, $Co(C_7H_{15}COO)_2$, $Zn(C_7H_{15}COO)_2$, $Zr(C_7H_{15}COO)_4$, $Y(C_7H_{15}COO)_3$ and $La(C_7H_{15}COO)_3$.

Specific examples of the above-mentioned naphthenates include salts of naphthenic acid represented by the general formula $C_nH_{2n-1}COOH$ such as cobalt naphthenate, copper naphthenate, manganese naphthenate, iron naphthenate, nickel naphthenate, vanadium naphthenate, yttrium naphthenate and lanthanum naphthenate.

Specific examples of the alcohols to be used as the above-mentioned organic solvent include methyl alcohol, ethyl alcohol, isopropyl alcohol, ethylene glycol and propylene glycol.

As the method of electrochemically depositing on the surface of the active material, there may be included a method in which particles are grown electrochemically to bring the distribution of the transition metal in the central and surface portions into a desired distribution state. More specifically, for example, there can be mentioned a method in which while the pH is being controlled, a precursor is prepared in which the concentration gradients of a transition metal salt and a Li salt are formed by utilizing a difference in ease of precipitation, and the precursor is calcined to obtain the objected particles. However, the method concerned is not limited thereto.

As the above-mentioned method of coating the surface by vapor deposition, the thermal CVD (Chemical Vapor Deposition) method, the plasma CVD method, the laser CVD method, the filament method, the reactive sputtering method, or the electron beam method can be adopted. A vapor phase reaction is caused to prepare the coating material in the thermal CVD by heating, in the plasma CVD by discharge, in the laser CVD by a thermal or optical energy, in the filament method by heating a filament of tungsten or the like, in the reactive sputtering method by conducting sputtering in the atmosphere of a reactive gas, and in the electron beam method by heating with an electron beam, respectively. For the reactive sputtering method and the electron beam method, it is preferable that the source material is solid.

[Electrode Structure]

Figure 7A:
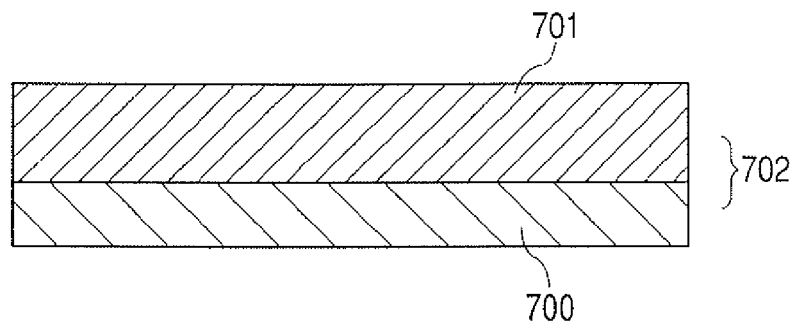
FIGS. 7A, 7B and 7C are sectional views schematically illustrating one example of an electrode structure formed of the electrode material of the present invention.
Figure 7B:
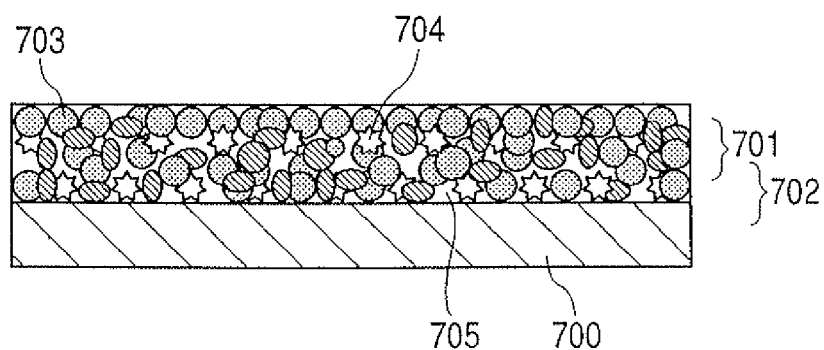
Figure 7C:
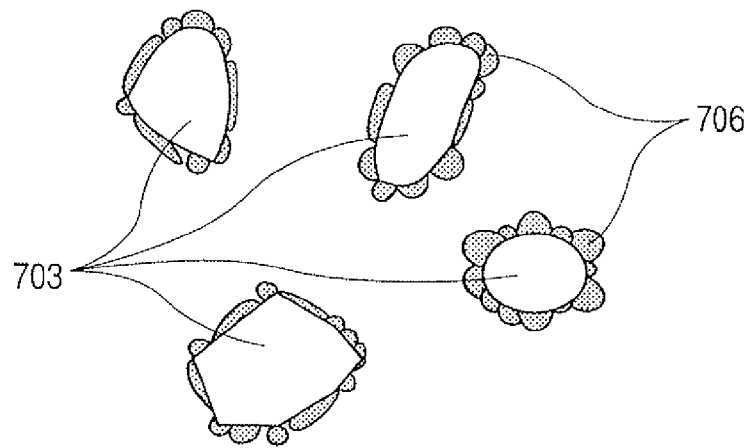

FIGS. 7A to 7C are conceptual views schematically illustrating a section of one example of an electrode structure formed of the electrode material of the present invention. In FIGS. 7A to 7C, reference numeral 700 denotes a current collector, 701 denotes an electrode material layer, 702 denotes an electrode structure, 703 denotes an active material (electrode material), 704 denotes an conductive auxiliary material, and 705 denotes a binder. The electrode structure 702 shown in FIG. 7A has a configuration in which the electrode material layer 701 comprised of an electrode material powder (positive electrode material powder) is provided on the current collector 700. The electrode structure 702 shown in FIG. 7S has a configuration in which the electrode material layer 701 comprised of an active material (positive electrode material powder) 703, the conductive auxiliary material 704 and the binder 705 is provided on the current collector 700. Incidentally, in FIGS. 7A and 7B, the electrode material layer 701 is provided on one side of the current collector 700, but the electrode material layer 701 may be provided on both sides of the current collector 700, depending on the form of the battery. Further, FIG. 7C is a conceptual view schematically illustrating sections of the particles of one example of the electrode material of the present invention.

[Fabrication of Electrode Structure 702]

The electrode structure 702 can be fabricated by forming the electrode material layer 701 by disposing and pressure molding the electrode material comprising an active material (positive electrode material powder) on the current collector 700. For example, the electrode structure 702 can be fabricated by mixing the active material 703 (positive electrode material) with the binder 705 and the conductive auxiliary material 704, and by molding the mixture thus obtained together with the current collector 700. Alternatively, the electrode structure 702 can be fabricated by mixing the positive electrode material powder 703 with the binder 705 and the conductive auxiliary material 704, appropriately adding a solvent to the mixture to adjust the viscosity of the mixture to thereby prepare a paste, applying the paste to the current collector 700 and then effect drying to form the electrode material layer 701. At this time, the thickness of the formed electrode material layer 701 is regulated with the aid of a roll press machine or the like, as needed. The fabrication of the electrode structure is carried out preferably in sufficiently dehumidified, dry air, and more preferably in an inert gas atmosphere.

Incidentally, it is also preferable that after the fabrication of the electrode structure, the electrode structure is dehydrated, for example, by microwave heating or the like, and dehydrated by a vacuum dryer.

Now, description will be made below on the respective constituent materials of the electrode structure 702.

[Conductive Auxiliary Material 704]

The role of the conductive auxiliary material 704 is to aid the electronic conduction and to facilitate the current collection because the active material 703 (the electrode material powder (positive electrode material powder) of the present invention) has little electronic conductivity. As the conductive auxiliary material 704, there can be used various carbonaceous materials such as acetylene black, Ketjenblack and graphite powder, and metallic materials such as nickel, titanium, copper and stainless steel. It is preferable that the mixing ratio by weight of the conductive auxiliary material 704 to the active material 703 (the electrode material powder (positive electrode material powder) of the present invention) is 1 or less.

[Binder 705]

The binder 705 has a role of bonding the fine particles of the electrode material powder 703 to each other to prevent generation of cracks in the electrode material layer leading to peeling off thereof from the current collector 700 during charging/discharging cycles. As the binder 705, there can be used one or more types of resins, stable in organic solvents, selected from the group consisting of fluororesin, polyvinylidene fluoride, styrene-butadiene rubber, polyethylene, polyproylene, silicone resin and polyvinyl alcohol. Incidentally, it is preferable that the mixing ratio by weight of the binder 705 to the active material 703 (the electrode material powder (positive electrode material powder) of the present invention) is 0.1 or less.

[Current Collector 700]

As the current collector 700, there can be used those materials which are inert to battery reactions such as fibrous, porous or mesh-like aluminum, titanium, nickel, stainless steel, platinum and the like.

[Electrode Material Layer 701]

The electrode material layer 701 is a layer mainly composed of the electrode material powder 703 (the electrode material powder (positive electrode material powder) of the present invention), and actually a composite layer comprising the electrode material powder, the conductive auxiliary material, a polymer material as the binder, and the like.

The electrode material layer 701 can be formed by appropriately adding and mixing the conductive auxiliary material 704 and the binder 705 with the electrode material powder 703, applying the thus obtained mixture to the current collector 700 and then effecting pressure molding. For the purpose of facilitating the application, it is preferable that a solvent is added to the above-mentioned mixture to prepare a paste. As the application method, for example, the coater application method and the screen printing method can be adopted. Alternatively, the electrode material layer 701 can be formed without adding a solvent, by mixing the electrode material powder 703, the conductive auxiliary material 704 and the binder 705 with each other or mixing the electrode material powder with the conductive auxiliary material without adding the binder, disposing the thus obtained mixture on the current collector and effecting pressure molding.

Figure 8:
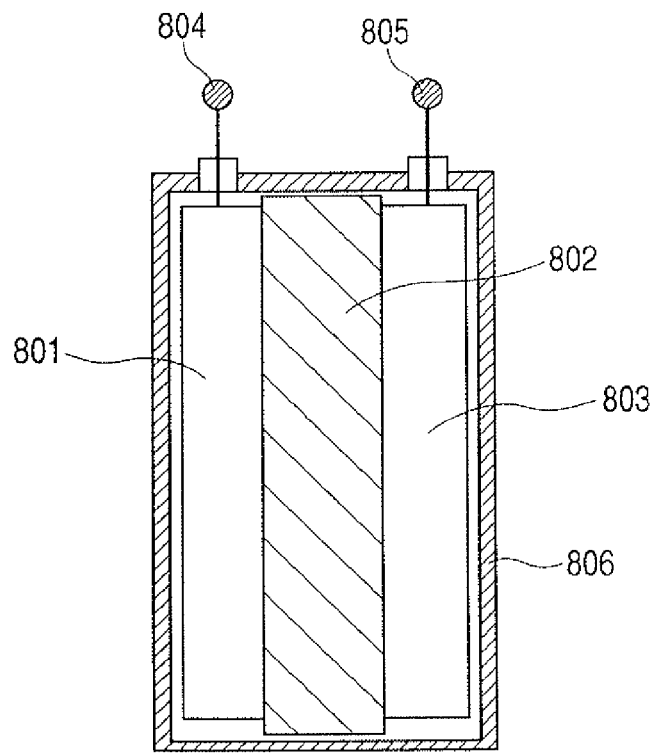
FIG. 8 is a sectional view schematically illustrating the configuration of one example of a lithium secondary battery of the present invention.

FIG. 8 is a conceptual view schematically illustrating the configuration of one example of a lithium secondary battery of the present invention. In the lithium secondary battery shown in FIG. 8, a positive electrode 803 (the above-described electrode structure of the present invention) and a negative electrode 801 face each other with an ionic conductor (electrolyte) 802 therebetween and are contained in a battery housing (case) 806; and the negative electrode 801 and the positive electrode 803 are connected to a negative terminal 804 and a positive terminal 805, respectively.

Now, description will be made below on these respective constituent members.

[Positive Electrode 803]

As the positive electrode 803, the above-described electrode structure 702 of the present invention is used.

[Negative Electrode 801]

The negative electrode 801 as a counter electrode of the positive electrode 803 comprises at least a negative electrode material (negative electrode active material) which works as the host material for lithium ions, and preferably comprises a layer formed of a negative electrode material which works as the host material for lithium ions and a current collector. Furthermore, it is preferable that the layer formed of the negative electrode material comprises the negative electrode material that works as the host material for lithium ions and a binder, or, as the occasion demands, further comprises a conductive auxiliary material, in addition to these materials.

[Negative Electrode Material]

As the negative electrode material as the host material for lithium ions, there can be used at least one of the materials selected from the group consisting of carbon, metallic materials capable of electrochemically alloying with lithium, lithium metal, transition metal oxides, transition metal sulfides, transition metal nitrides, lithium/transition-metal oxides, lithium/transition-metal sulfides, and lithium/transition-metal nitrides. As the above-mentioned metallic materials capable of electrochemically alloying with lithium, there can be preferably used metallic materials containing at least one element selected from the group consisting of silicon, tin, lithium, magnesium, aluminum, potassium, sodium, calcium, zinc, and lead. Additionally, the transition metal elements for the above-mentioned transition metal oxides, transition metal sulfides, and transition metal nitrides are those elements which have a partially filled d- or f-shell and include Sc, Y, the lanthanoids, the actinoids, Ti, Zr, Hf, V, Nb, Ta, Cr, Mo, W, Mn, Tc, Re, Fe, Ru, Os, Co, Rh, Ir, Ni, Pd, Pt, Cu, Ag and Au. For the purpose of obtaining a lithium secondary battery having a high energy density, it is preferable that lithium metal is used for the negative electrode material (negative electrode active material)

[Negative Electrode Current Collector]

As the current collector used for the negative electrode, there can be used fibrous, porous or mesh like carbon, stainless steel, titanium, nickel, copper, platinum, gold and the like.

[Ionic Conductor 802]

As the ionic conductor 802, there can be used the lithium ion conductors such as a separator made to hold an electrolyte solution (a solution prepared by dissolving an electrolyte in a solvent), a solid electrolyte, or a solidified electrolyte prepared by gelling an electrolyte solution with a polymer gel or the like.

It is preferable that the ionic conductor 802 has as high a conductivity as possible, and the conductivity thereof at 25° C. is preferably at least $1 \times 10^{-3}$ S/cm or more, more preferably $5 \times 10^{-3}$ S/cm or more.

[Electrolyte]

As the above-mentioned electrolyte, there may be used salts that consist of lithium ion ($Li^+$) and a Lewis acid ion ($BF_4^-$, $PF_6^-$, $AsF_6^-$, $ClO_4^-$, $CF_3SO_3^-$, $(CF_3SO_2)_3C^-$, $(CF_3SO_2)_2N^-$, $B(C_6H_5)_4^-$, $C_4F_9SO_3^-$), and mixed salts thereof. In addition to these, salts that consist of a cation such as sodium ion, potassium ion, and tetraalkylammonium ion and a Lewis acid ion can also be used. It is preferable that these salts have preliminarily been subjected to a treatment such as heating under a reduced pressure or the like to perform sufficient dehydration and deoxidation. As a gelling agent, it is preferable to use those polymers that absorb the solvent of the electrolytic solution to swell, and preferred examples of such polymers include polyethylene oxide, polyvinyl alcohol, polyacrylonitrile, polyvinylidene fluoride, etc.

[Solvent for Electrolyte]

As the solvent for the above-mentioned electrolyte, there may be used acetonitrile ($CH_3CN$), benzonitrile ($C_6H_5CN$), propylene carbonate (PC), ethylene carbonate (EC), dimethylformamide (DMF), tetrahydrofuran (THF), nitrobenzene ($C_6H_5NO_2$), dichloroethane, diethoxyethane, chlorobenzene, γ-butyrolactone, dioxolane, sulfolane, nitromethane, dimethylsulfide, dimethylsulfoxide, dimethoxyethane, methyl formate, 3-methyl-2-oxazolidinone, 2 methyltetrahydrofuran, sulfur dioxide, phosphoryl chloride, thionyl chloride, sulfuryl chloride, or a mixed solution thereof.

These solvents may preferably be dehydrated using, for example, activated alumina, molecular sieve, phosphorus pentoxide, calcium chloride, etc., and some solvents may be desirably further subjected to distillation in the presence of an alkaline metal in an inert gas for removing impurities and dehydration.

In order to prevent leakage of the electrolyte solution, it is preferable to use a solid electrolyte or a solidified electrolyte. As the solid electrolyte, there may be included a glass material such as an oxide comprising lithium, silicon, oxygen, and phosphorus or sulfur elements, a polymer complex of an organic polymer having an ether structure. As the solidified electrolyte, there are preferably used those obtained by gelling the above electrolyte solution with a gelling agent to solidify the electrolyte solution. As the gelling agent, it is preferable to use those polymers that absorb the solvent of the electrolytic solution to swell, and preferred examples of such polymers include polyethylene oxide, polyvinyl alcohol, polyacrylonitrile, polyvinylidene fluoride, etc.

[Separator]

The separator plays the role of preventing short-circuiting between the negative electrode 801 and the positive electrode 803 in the lithium secondary battery. It may also have a role of retaining the electrolyte solution.

The separator is required to have fine pores through which lithium ions can pass and to be insoluble and stable in the electrolyte solution. Accordingly, as the separator, there are preferably used, for example, a nonwoven fabric or a micropore structure material of glass, a polyolefin such as polypropylene or polyethylene, a fluororesin, etc. Alternatively, a metal oxide film having micropores or a resin film complexed with a metal oxide may also be used.

[Shape and Structure of Battery]

Examples of the shapes of the lithium secondary battery of the present invention include, for example, a flat type, a cylindrical type, a rectangular parallelepiped type, a sheet type, etc. Further, examples of the structure of the battery includes, for example, a monolayer type, a multilayer type, a spiral type, etc. Of the above-mentioned, a spiral type cylindrical battery has the advantages that an enlarged electrode area can be secured by interposition of a separator between positive and negative electrodes followed by rolling up, and thus a large current can be passed at the time of charging/discharging. Batteries of rectangular parallelepiped type and sheet type have an advantage that they can effectively make use of storage spaces in an apparatus which accommodates and is constituted of a plurality of batteries.

Figure 9:
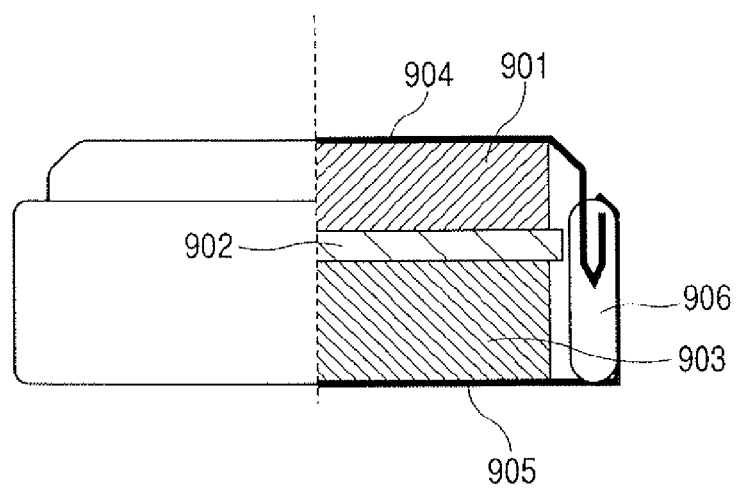
FIG. 9 is a sectional view schematically illustrating the configuration of one example of a flat type (coin type) lithium secondary battery.
Figure 10:
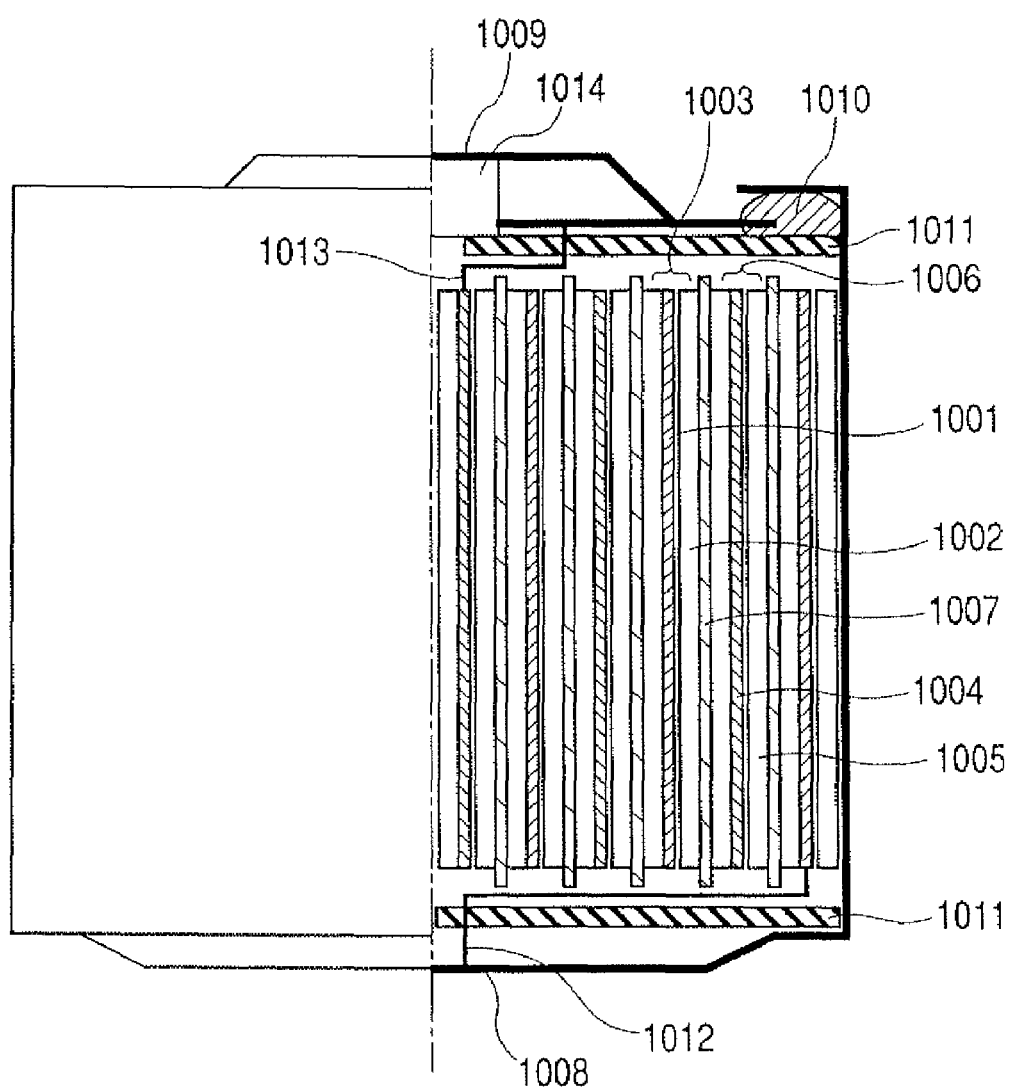
FIG. 10 is a sectional view schematically illustrating the configuration of one example of a spiral type cylindrical lithium secondary battery.

FIG. 9 is a sectional view schematically showing the structure of an example of a flat type (coin type) lithium secondary battery. FIG. 10 is a sectional view schematically showing the structure of an example of a spiral type cylindrical lithium secondary battery. In FIGS. 9 and 10, reference numerals 901 and 1003 each denote a negative electrode; 903 and 1006 each denote a positive electrode; 904 and 1008 each denote a negative terminal (negative electrode cap or negative electrode can); 905 and 1009 each denote a positive terminal (positive electrode can or positive electrode cap); 902 and 1007 each denote an ionic conductor; 906 and 1010 each denote a gasket; 1001 denotes a negative electrode collector; 1007 denotes a positive electrode collector; 1011 denotes an insulating plate; 1012 denotes a negative electrode lead; 1013 denotes a positive electrode lead; and 1014 denotes a safety valve, respectively.

[Flat Type (Coin Type) Lithium Secondary Battery]

In the flat type (coin type) lithium secondary battery shown in FIG. 9, the positive electrode 903 with a positive electrode material layer, and the negative electrode 901 with a negative electrode material layer are stacked through at least, for example, the ionic conductor 902 formed of a separator holding an electrolytic solution, and the stack is housed in the positive electrode can 905 as a positive terminal from the positive electrode side, and the negative electrode side is covered with the negative electrode cap 904 which functions as a negative terminal. The gasket 906 is arranged at other portions in the positive electrode can.

[Spiral Cylindrical Type Lithium Secondary Battery]

In the spiral cylindrical type lithium secondary battery shown in FIG. 10, the positive electrode 1006 with a positive electrode active material layer 1005 formed on the positive electrode collector 1004, and negative electrode 1003 with a negative electrode active material layer 1002 formed on the negative electrode collector 1001 face each other through at least, for example, the ionic conductor 1007 formed of a separator holding an electrolytic solution and form a cylindrical stack as rolled up multiple times. This rolled up, cylindrical stack is housed in a negative electrode can 1008 as a negative terminal. A positive electrode cap 1009 as a positive terminal is formed on the opening side of the negative electrode can 1008, and the gasket 1010 is arranged at other portions in the negative electrode can 1008. Moreover, the cylindrical stack is isolated from the positive electrode cap side with the insulating plate 1011 therebetween. The positive electrode 1006 is connected to the positive electrode cap 1009 via a positive electrode lead 1013. The negative electrode 1003 is connected to the negative electrode can 1008 via a negative electrode lead 1012. A safety valve 1014 for adjusting the pressure inside the battery is provided on the positive electrode cap side.

Incidentally, the layers comprised of the aforementioned positive electrode material powder of the present invention are used for the active material layer of the positive electrode 903 in FIG. 9 and for the active material layer 1005 of the positive electrode 1006 in FIG. 10.

[Assembling of Batteries]

A typical assembling process of the batteries shown in FIGS. 9 and 10 will be described below.

(1) A negative electrode (901,1003) and a positive electrode (903,1006) are incorporated in a positive electrode can (905) or negative electrode can (1008) with a separator (901,1007) therebetween.

(2) After an electrolyte is injected, a negative electrode cap (904) or a positive electrode cap (1009) and a gasket (906, 1010) are assembled.

(3) The assembly obtained in (2) above is caulked to complete a battery.

The preparation of the materials for the lithium secondary battery and the assembly of the battery are preferably carried out in a dry air or a dry inert gas from which moisture has been sufficiently removed.

The components that constitute the lithium secondary battery mentioned above will be described below.

[Gasket]

As a material of the (906,1010), a fluororesin, polyamide resin, polysulfone resin, and various kinds of rubbers can be used, for example. As a sealing method of the battery, methods utilizing glass sealing, adhesives, welding, or soldering can be employed in addition to the "caulking" using a gasket such as shown in FIGS. 9 and 10. Various organic resin material and ceramics can be used as a material of the insulating plate (1011) of FIG. 10.

[Outer Can]

The outer can of the battery consists of a positive electrode can or negative electrode can (905,1008) and a negative electrode cap or positive electrode cap (904,1009). As a constituent material of the outer can, stainless steel is preferably used. Especially, a titanium clad stainless steel sheet, a copper clad stainless steel sheet, a nickel-plated sheet iron, and the like can be widely used.

Since the positive electrode can (905) in FIG. 9 and the negative electrode can (1008) in FIG. 10 each serve both as a battery housing (case) and as a terminal, stainless steel is preferably used as the constituting material. However, when the positive electrode can or negative electrode can does not serve both as a battery housing and as a terminal, the material of the battery case may include metals such as zinc, plastics such as polypropylene and a composite material of metal or glass fiber with a plastic, in addition to stainless steel.

[Safety Valve]

The lithium secondary battery is equipped with a safety valve as safety measures in case of increase in the pressure inside the battery. As the safety valve, rubber, a spring, a metal ball, burst foil, etc. can be used, for example.

EXAMPLES

The present invention will be described in detail by way of the examples shown below. These examples are only illustrative and the present invention is not limited to these examples.

Example 1

The lithium secondary battery having the configuration shown in FIG. 8 was fabricated as follows.

1. Preparation of Electrode Material (Positive Electrode Active Material)

(1) Synthesis of $LiNi_{0.975}Ti_{0.025}O_2$:

Lithium citrate, nickel nitrate and tetraethoxytitanium (Ti$(OC_2H_5)_4$) were weighed out in such a way that the relations Li/(Ni+Ti)=1.06 (atomic ratio) and Ni/Ti=97.5/2.5 (atomic ratio) were satisfied; then, the lithium citrate and nickel nitrate were dissolved in a 20 wt % aqueous solution of citric acid; while the aqueous solution was heated to 60° C. and being stirred, the tetraethoxytitanium (Ti$(OC_2H_5)_4$) was added to the aqueous solution, and thereafter the aqueous solution thus obtained was spray-dried with the aid of a spray dryer to obtain a precursor. The thus obtained precursor was calcined at 750° C. for 12 hours in an oxygen atmosphere (supplied at a rate of 3 L/min) to synthesize $LiNi_{0.975}Ti_{0.025}O_2$ for forming the central portion.

(2) Formation of $LiNi_{0.9}V_{0.1}O_2$ as surface portion covering $LiNi_{0.975}Ti_{0.025}O_2$ particle (hereinafter referred to as "central portion particle") obtained in (1) above:

Lithium nitrate, nickel nitrate and vanadyl ethoxide ($VO(OC_2H_5)_2$) were dissolved in ethanol in such a way that the relations Li/(Ni+V)=1.06 (atomic ratio) and Ni/V=90/10 (atomic ratio) were satisfied; the central portion particle material obtained in (1) above was dispersed in the ethanol solution in such a way that the relation $(Ni+V)_{surface\ portion}/(Ni+Ti)_{central\ portion}=0.03$ (atomic ratio; the subscripts signify the elements constituting the surface portion and the central portion, respectively and the same designations will be used hereinafter) was satisfied; then, the ethanol was evaporated with the aid of a rotary evaporator to obtain a precursor in which the lithium salt, nickel salt and vanadium salt were physically adhered to the surface of the above described central portion particles. The thus obtained precursor was calcined at 500° C. for 3 hours in an oxygen atmosphere to obtain positive electrode active material particles (powder).

(3) Analysis of positive electrode active material powder

From diffraction peaks based on X-ray diffraction analysis (XRD) of the thus obtained positive active material particle, the positive electrode active material was confirmed to have a single, crystalline structure having the α-$NaFeO_2$ structure.

From results of an observation with a scanning electron microscope (SEM), it was confirmed that the active material particles had an average particle diameter of 3 μm.

On the basis of scanning micro-Auger analysis, the elemental analysis in the depth direction was carried out for the positive electrode active material particle, and consequently, it was found that from the surface to a depth of about 0.15 μm, Ni/V=90/10 (atomic ratio), and for depth values of 0.15 μm or more, the presence of V element was not recognized. Further, up to the depth of 0.15 μm, the presence of Ti element was not recognized, while for the depth values of 0.15 μm or more, it was confirmed that Ni/Ti=97.5/2.5 (atomic ratio).

2. Fabrication of Lithium Secondary Battery (1) Fabrication of positive electrode 803

The positive electrode active material particles (powder) obtained in 1 above, acetylene black and polytetrafluoroethylene powder were mixed together in a weight ratio of 80:16:4, n-methyl-2-pyrrolidone was added to the thus obtained mixture, followed by sufficient kneading to prepare a slurry. The slurry was uniformly applied on one surface of a sheet of 30 μm thick aluminum foil as a positive electrode current collector, dried and then pressure molded with a roll press machine to obtained a sheet-shaped electrode structure having on the positive electrode current collector the positive electrode active material layer comprising the above-described positive electrode active material particles. The electrode structure was blanked into a disk of 5 mm in diameter, and the disk obtained was dried at 80° C. for 3 hours in a vacuum dryer to fabricate the positive electrode 803.

(2) Fabrication of negative electrode 801

A sheet of 0.5 mm thick lithium metal foil was pressure bonded to a sheet of 30 μm thick rolled copper foil, and the bonded sheet thus obtained was blanked into a disk of 5 mm in diameter to fabricate the negative electrode 801.

(3) Ionic conductor 802

As the ionic conductor 802, there was used a separator which held an electrolyte solution (a solution prepared by dissolving an electrolyte in a solvent). More specifically, as the electrolyte solution, an electrolyte solution was prepared by dissolving lithium tetrafluoroborate as an electrolyte in 1 M (mol/l) in a mixed liquid medium of equivalent amounts of ethylene carbonate (EC) and dimethyl carbonate (DME). As the separator, a microporous separator of polypropylene sandwiched by two sheets of polypropylene unwoven fabric was prepared.

(4) Assembling of battery

The separator prepared in (3) above was sandwiched by the positive electrode 803 fabricated in (1) above and the negative electrode 801 fabricated in (2) above; the thus obtained stack was inserted into the positive electrode can 905 made of a titanium clad stainless steel material, and then the electrolyte solution prepared in (3) above was injected into the can; thereafter, the negative electrode cap 904 made of a titanium clad stainless steel material and the gasket 906 made of a fluororubber were used for sealing to fabricated a lithium secondary battery.

3. Evaluation of Battery Performance

The performance of the lithium secondary battery obtained in 2 above was evaluated through a charge/discharge cycle test. More specifically, the charge/discharge cycle test of the lithium secondary battery was carried out by a constant current charge/discharge test at room temperature of 25° C. and at 60° C. in which at a charging current density of 0.2 mA/$cm^2$, charging was continued until a cut-off voltage of 4.2 V was reached, and then at a discharging current density of 0.2 mA/$cm^2$, discharging was continued until a cut-off voltage of 2.5 V was reached; with this cycle being defined as one cycle, 150 cycles of the charging/discharging were repeated; and a capacity retention ratio at the 150th cycle [capacity retention ratio (%)={discharge capacity at the 150th cycle/discharge capacity at the first cycle}×100] was obtained. The evaluation results obtained are shown in Table 1.

Example 2

A lithium secondary battery was fabricated and the performance thereof was evaluated by following the same procedure as in Example 1 with the exception that the electrode material (the positive electrode active material) was prepared as described below. The evaluation results obtained are shown in Table 1.

[Preparation of Electrode Material (Positive Electrode Active Material)]

In the same manner as that in 1-(1) of Example 1, $LiNi_{0.975}Ti_{0.025}O_2$ for forming the central portion was synthesized. Then, there was formed $LiNi_{0.9}Si_{0.1}O_2$ as the surface portion covering the $LiNi_{0.975}Ti_{0.025}O_2$ particle (hereinafter referred to as "central portion particle"). More specifically, lithium nitrate, nickel nitrate and tetraethoxysilane ($Si(OC_2H_5)_4$) were dissolved in ethanol in such a way that the relations Li/(Ni+Si)=1.06 (atomic ratio) and Ni/Si=90/10 (atomic ratio) were satisfied; the central portion particles were dispersed in the ethanol solution in such a way that the relation $(Ni+Si)_{surface\ portion}/(Ni+Ti)_{central\ portion}=0.03$ was satisfied; then the ethanol was evaporated with the aid of a rotary evaporator, and thus the precursor was obtained in which the lithium salt, nickel salt and silicate were physically adhered to the surface of the above described central portion particles. The obtained precursor was calcined at 500° C. for 3 hours in an oxygen atmosphere and thus the positive electrode active particles (powder) were obtained.

Example 3

A lithium secondary battery was fabricated and the performance thereof was evaluated by following the same procedure as in Example 1 with the exception that the electrode material (the positive electrode active material) was prepared as described below. The evaluation results obtained are shown in Table 1.

[Preparation of Electrode Material (Positive Electrode Active Material)]

(1) Synthesis of $LiNi_{0.9}Mn_{0.1}O_2$

Lithium citrate, nickel nitrate and manganese nitrate were weighed out in such a way that the relations Li/(Ni+Mn)=1.06 (atomic ratio) and Ni/Mn=90/10 (atomic ratio) were satisfied; then, these salts were dissolved in a 20 wt % aqueous solution of citric acid; the aqueous solution was spray-dried with the aid of a spray dryer and thus the precursor was obtained. The obtained precursor was calcined at 750° C. for 12 hours in an atmosphere of oxygen (supplied at a rate of 3 L/min), and thus $LiNi_{0.9}Mn_{0.1}O_2$ forming the central portion was synthesized.

(2) Formation of $LiNi_{0.9}Ti_{0.1}O_2$ as surface portion covering $LiNi_{0.9}Mn_{0.1}O_2$ particle (referred to as "central portion particle") obtained in (1) above:

Lithium nitrate, nickel nitrate and tetraethoxytitanium (Ti $(OC_2H_5)_4$) were dissolved in ethanol in such a way that the relations Li/(Ni+Ti)=1.06 (atomic ratio) and Ni/Ti=90/10 (atomic ratio) were satisfied; the above-described central portion particle material was dispersed in the ethanol solution in such a way that the relation $(Ni+Ti)_{surface\ portion}/(Ni+Mn)_{central\ portion}=0.03$ (atomic ratio) was satisfied; then, the ethanol was evaporated with the aid of a rotary evaporator, and thus the precursor was obtained in which the lithium salt, nickel salt and titanium salt were physically adhered to the surface of the above described central portion particles. The thus obtained precursor was calcined at 500° C. for 3 hours in an atmosphere of oxygen and thus the positive electrode active material particles (powder) were obtained.

Example 4

A lithium secondary battery was fabricated and the performance thereof was evaluated by following the same procedure as in Example 1 with the exception that the electrode material (the positive electrode active material) was prepared as described below. The evaluation results obtained are shown in Table 1.

[Preparation of Electrode Material (Positive Electrode Active Material)]

(1) Synthesis of $LiNi_{0.9}Co_{0.1}O_2$

Lithium citrate, nickel nitrate and cobalt nitrate were weighed out in such a way that the relations Li/(Ni+Co)=1.0 (atomic ratio) and Ni/Co=90/10 (atomic ratio) were satisfied; then, these salts were dissolved in a 20 wt % aqueous solution of citric acid; the aqueous solution was spray-dried with the aid of a spray dryer and thus the precursor was obtained. The obtained precursor was calcined at 750° C. for 12 hours in an atmosphere of oxygen (supplied at a rate of 3 L/min), and thus $LiNi_{0.9}Co_{0.1}O_2$ forming the central portion was synthesized.

(2) Formation of $LiNi_{0.9}V_{0.1}O_2$ as surface portion covering $LiNi_{0.9}Co_{0.1}O_2$ particle (hereinafter referred to as "central portion particle") obtained in (1) above:

Lithium nitrate, nickel nitrate and vanadyl ethoxide (VO $(OC_2H_5)_2$) were dissolved in ethanol in such a way that the relations Li/(Ni+V)=1.06 (atomic ratio) and Ni/V=90/10 (atomic ratio) were satisfied; the above-described central portion particle material was dispersed in the ethanol solution in such a way that the relation $(Ni+V)_{surface\ portion}/(Ni+Co)_{central\ portion}=0.03$ (atomic ratio) was satisfied; then, the ethanol was evaporated with the aid of a rotary evaporator, and thus the precursor was obtained in which the lithium salt, nickel salt and vanadium salt were physically adhered to the surface of the above-described central portion particles. The thus obtained precursor was calcined at 500° C. for 3 hours in an atmosphere of oxygen and thus the positive electrode active material particles (powder) were obtained.

Example 5

A lithium secondary battery was fabricated and the performance thereof was evaluated by following the same procedure as in Example 1 with the exception that the electrode material (the positive electrode active material) was prepared as described below. The evaluation results obtained are shown in Table 1.

[Preparation of Electrode Material (Positive Electrode Active Material)]

(1) Synthesis of $LiCo_{0.975}Ti_{0.025}O_2$:

Lithium citrate, cobalt nitrate and tetraethoxytitanium (Ti $(OC_2H_5)_4$) were weighed out in such a way that the relations Li/(Co+Ti)=1.0 (atomic ratio) and Co/Ti=97.5/2.5 (atomic ratio) were satisfied; then, the lithium citrate and cobalt nitrate were dissolved in a 20 wt % aqueous solution of citric acid; while the aqueous solution was heated to 60° C. and was being stirred, the tetraethoxytitanium (Ti(OC_2H_5)_4) was added to the aqueous solution, and thereafter the aqueous solution thus obtained was spray-dried with the aid of a spray dryer and thus the precursor was obtained. The thus obtained precursor was calcined at 800° C. for 12 hours in an atmosphere of oxygen (supplied at a rate of 3 L/min), and thus $LiCo_{0.975}Ti_{0.025}O_2$ forming the central portion was synthesized.

(2) Formation of $LiCo_{0.9}Al_{0.1}O_2$ as surface portion covering $LiCo_{0.975}Ti_{0.025}O_2$ particle (hereinafter referred to as "central portion particle") obtained in (1) above:

Lithium nitrate, cobalt nitrate and aluminum nitrate (Al $(NO_3)_3$) were dissolved in ethanol in such a way that the relations Li/(Co+Al)=1.0 (atomic ratio) and Co/Al=90/10 (atomic ratio) were satisfied; the above-described central portion particle material was dispersed in the ethanol solution in such a way that the relation $(Co+Al)_{surface\ portion}/(Co+Ti)_{central\ portion}=0.03$ (atomic ratio) was satisfied; then, the ethanol was evaporated with the aid of a rotary evaporator, and thus the precursor was obtained in which the lithium salt, cobalt salt and aluminum salt were physically adhered to the surface of the above-described central portion particles. The thus obtained precursor was calcined at 500° C. for 3 hours in an atmosphere of oxygen and thus the positive electrode active material particles (powder) were obtained.

Example 6

A lithium secondary battery was fabricated and the performance thereof was evaluated by following the same procedure as in Example 1 with the exception that the electrode material (the positive electrode active material) was prepared as described below. The evaluation results obtained are shown in Table 1.

[Preparation of Electrode Material (Positive Electrode Active Material)]

In the same manner as that in (1) of Example 5, $LiCo_{0.975}Ti_{0.025}O_2$ forming the central portion was synthesized. Then, there was formed $LiCo_{0.9}Mg_{0.1}O_2$ as the surface portion covering the $LiCo_{0.975}Ti_{0.025}O_2$ particle (hereinafter referred to as "central portion particle"). More specifically, lithium nitrate, cobalt nitrate and magnesium nitrate were dissolved in ethanol in such a way that the relations Li/(Co+Mg)=1.0 (atomic ratio) and Co/Mg=90/10 (atomic ratio)

were satisfied; the above-described central portion particles were dispersed in the ethanol solution in such a way that the relation $(Co+Mg)_{surface\ portion}/(Co+Ti)_{central\ portion}=0.03$ is satisfied; then the ethanol was evaporated with the aid of a rotary evaporator, and thus the precursor was obtained in which the lithium salt, cobalt salt and magnesium salt were physically adhered to the surface of the above-described central portion particles. The thus obtained precursor was calcined at 500° C. for 3 hours in an atmosphere of oxygen and thus the positive electrode active particles (powder) were obtained.

Example 7

A lithium secondary battery was fabricated and the performance thereof was evaluated by following the same procedure as in Example 1 with the exception that the electrode material (the positive electrode active material) was prepared as described below. The evaluation results obtained are shown in Table 1.

[Preparation of the Electrode Material (Positive Electrode Active Material)]
(1) Synthesis of $LiCo_{0.975}Al_{0.025}O_2$ Lithium citrate, cobalt nitrate and aluminum nitrate (Al $(NO_3)_3$) were weighed out in such a way that the relations $Li/(Co+Al)=1.0$ (atomic ratio) and $Co/Al=97.5/2.5$ (atomic ratio) were satisfied; then, these salts were dissolved in a 20 wt % aqueous solution of citric acid; the aqueous solution was spray-dried with the aid of a spray dryer and thus the precursor was obtained. The thus obtained precursor was calcined at 800° C. for 12 hours in an atmosphere of oxygen (supplied at a rate of 3 L/min), and thus $LiCo_{0.975}Al_{0.025}O_2$ forming the central portion was synthesized.

(2) Formation of $LiCo_{0.9}Mg_{0.1}O_2$ as surface portion covering $LiCo_{0.975}Al_{0.025}O_2$ particle (hereinafter referred to as "central portion particle") obtained in (19) above:

Lithium nitrate, cobalt nitrate and magnesium nitrate were dissolved in ethanol in such a way that the relations $Li/(Co+Mg)=1.0$ (atomic ratio) and $Co/Mg=90/10$ (atomic ratio) were satisfied; the above-described central portion particle material was dispersed in the ethanol solution in such a way that the relation $(Co+Mg)_{surface\ portion}/(Co+Al)_{central\ portion}=0.03$ (atomic ratio) was satisfied; then, the ethanol was evaporated with the aid of a rotary evaporator, and thus the precursor was obtained in which the lithium salt, cobalt salt and magnesium salt were physically adhered to the surface of the above-described central portion particles. The thus obtained precursor was calcined at 500° C. for 3 hours in an atmosphere of oxygen and thus the positive electrode active material particles (powder) were obtained.

Example 8

A lithium secondary battery was fabricated and the performance thereof was evaluated by following the same procedure as in Example 1 with the exception that the electrode material (the positive electrode active material) was prepared as described below. The evaluation results obtained are shown in Table 1.

[Preparation of Electrode Material (Positive Electrode Active Material)]
(1) Synthesis of $LiCo_{0.975}Mn_{0.025}O_2$ Lithium citrate, cobalt nitrate and manganese nitrate were weighed out in such a way that the relations $Li/(Co+Mn)=1.0$ (atomic ratio) and $Co/Mn=97.5/2.5$ (atomic ratio) were satisfied; then, these salts were dissolved in a 20 wt % aqueous solution of citric acid; the aqueous solution was spray-dried with the aid of a spray dryer and thus the precursor was obtained. The thus obtained precursor was calcined at 800° C. for 12 hours in an atmosphere of oxygen (supplied at a rate of 3 L/min), and thus $LiCo_{0.975}Mn_{0.025}O_2$ forming the central portion was synthesized.

(2) Formation of $LiCo_{0.9}Al_{0.1}O_2$ as surface portion covering $LiCo_{0.975}Mn_{0.025}O_2$ particle (hereinafter referred to as "central portion particle") obtained in (1) above:

Lithium nitrates cobalt nitrate and aluminum nitrate (Al $(NO_3)_3$) were dissolved in ethanol in such a way that the relations $Li/(Co+Al)=1.0$ (atomic ratio) and $Co/Al=90/10$ (atomic ratio) were satisfied; the above-described central portion particle material was dispersed in the ethanol solution in such a way that the relation $(Co+Al)_{surface\ portion}/(Co+Mn)_{central\ portion}=0.03$ (atomic ratio) was satisfied; then, the ethanol was evaporated with the aid of a rotary evaporator, and thus the precursor was obtained in which the lithium salt, cobalt salt and aluminum salt were physically adhered to the surface of the above-described central portion particles. The thus obtained precursor was calcined at 500° C. for 3 hours in an atmosphere of oxygen and thus the positive electrode active material particles (powder) were obtained.

Example 9

A lithium secondary battery was fabricated and the performance thereof was evaluated by following the same procedure as in Example 1 with the exception that the electrode material (the positive electrode active material) was prepared as described below. The evaluation results obtained are shown in Table 1.

[Preparation of the Electrode Material (Positive Electrode Active Material)]
(1) Synthesis of $LiCo_{0.9}Ni_{0.1}O_2$ Lithium citrate, cobalt nitrate and nickel nitrate were weighed out in such a way that the relations $Li/(Co+Ni)=1.0$ (atomic ratio) and $Co/Ni=90/10$ (atomic ratio) were satisfied; then, these salts were dissolved in an aqueous solution of citric acid; the aqueous solution was spray-dried with the aid of a spray dryer and thus the precursor was obtained. The obtained precursor was calcined at 800° C. for 12 hours in an atmosphere of oxygen (supplied at a rate of 3 L/min), and thus $LiCo_{0.9}Ni_{0.1}O_2$ forming the central portion was synthesized.

(2) Formation of $LiCo_{0.9}Al_{0.1}O_2$ as surface portion covering $LiCo_{0.9}Ni_{0.1}O_2$ particle (hereinafter referred to as "central portion particle") obtained in (1) above:

Lithium nitrate, cobalt nitrate and aluminum nitrate (Al $(NO_3)_3$) were dissolved in ethanol in such a way that the relations $Li/(Co+Al)=1.0$ (atomic ratio) and $Co/Al=90/10$ (atomic ratio) were satisfied; the above-described central portion particle material was dispersed in the ethanol solution in such a way that the relation $(Co+Al)_{surface\ portion}/(Co+Ni)_{central\ portion}=0.03$ (atomic ratio) was satisfied; then, the ethanol was evaporated with the aid of a rotary evaporator, and thus the precursor was obtained in which the lithium salt, cobalt salt and aluminum salt were physically adhered to the surface of the above-described central portion particles. The thus obtained precursor was calcined at 500° C. for 3 hours in an atmosphere of oxygen and thus the positive electrode active material particles (powder) were obtained.

Comparative Example 1

A lithium secondary battery was fabricated and the performance thereof was evaluated by following the same procedure as in Example 1 with the exception that the electrode material (the positive electrode active material) was prepared as described below. The evaluation results obtained are shown in Table 1.

[Preparation of Electrode Material (Positive Electrode Active Material)]

Lithium citrate and nickel nitrate were weighed out in such a way that the relation Li/Ni=1.06 (atomic ratio) was satisfied; then, these salts were dissolved in a 20 wt % aqueous solution of citric acid; the aqueous solution was spray-dried with the aid of a spray dryer and thus the precursor was obtained. The thus obtained precursor was calcined at 750° C. for 12 hours in an atmosphere of oxygen (supplied at a rate 3 L/min), and thus $LiNiO_2$ particles (powder) were obtained, which were used as the positive electrode active material.

Comparative Example 2

A lithium secondary battery was fabricated and the performance thereof was evaluated by following the same procedure as in Example 1 with the exception that the electrode material (the positive electrode active material) was prepared as described below. The evaluation results obtained are shown in Table 1.

[Preparation of Electrode Material (Positive Electrode Active Material)]

In the same manner as that in Comparative Example 1, $LiNiO_2$ forming the central portion was prepared. Then, there was formed $LiNi_{0.9}V_{0.1}O_2$ as the surface portion covering the $LiNiO_2$ particle (hereinafter referred to as "central portion particle"). More specifically, lithium nitrate, nickel nitrate and vanadyl ethoxide ($VO(OC_2H_5)_2$) were dissolved in ethanol in such a way that the relations Li/(Ni+V)=1.06 (atomic ratio) and Ni/V=90/10 (atomic ratio) were satisfied; the above-described central portion particle material was dispersed in the ethanol solution in such a way that the relation $(Ni+V)_{surface\ portion}/Ni_{central\ portion}=0.03$ (atomic ratio) was satisfied; then, the ethanol was evaporated with the aid of a rotary evaporator, and thus the precursor was obtained in which the lithium salt, nickel salt and vanadium salt were physically adhered to the surface of the above-described central portion particles. The thus obtained precursor was calcined at 500° C. for 3 hours in an atmosphere of oxygen and thus the positive electrode active material particles (powder) were obtained.

Comparative Example 3

A lithium secondary battery was fabricated and the performance thereof was evaluated by following the same procedure as in Example 1 with the exception that the electrode material (the positive electrode active material) was prepared as described below. The evaluation results obtained are shown in Table 1.

[Preparation of Electrode Material (Positive Electrode Active Material)]

Lithium citrate, nickel nitrate and tetraethoxytitanium (Ti$(OC_2H_5)_4$) were weighed out in such a way that the relations Li/(Ni+Ti)=1.06 (atomic ratio) and Ni/Ti=97.5/2.5 (atomic ratio) were satisfied; then, the lithium citrate and nickel nitrate were dissolved in a 20 wt % aqueous solution of citric acid; while the aqueous solution was heated to 60° C. and was being stirred, the tetraethoxytitanium (Ti$(OC_2H_5)_4$) was added to the aqueous solution, and thereafter the aqueous solution thus obtained was spray-dried with the aid of a spray dryer and thus the precursor was obtained. The thus obtained precursor was calcined at 750° C. for 12 hours in an atmosphere of oxygen (supplied at a 3 L/min), and thus $LiNi_{0.975}Ti_{0.025}O_2$ particles (powder) were obtained, which were used as the positive electrode active material.

Comparative Example 4

A lithium secondary battery was fabricated and the performance thereof was evaluated by following the same procedure as in Example 1 with the exception that the electrode material (the positive electrode active material) was prepared as described below. The evaluation results obtained are shown in Table 1.

[Preparation of Electrode Material (Positive Electrode Active Material)]

Lithium citrate, nickel nitrate and manganese nitrate were weighed out in such a way that the relations Li/(Ni+Mn)=1.06 (atomic ratio) and Ni/Mn=90/10 (atomic ratio) were satisfied; then, these salts were dissolved in a 20 wt % aqueous solution of citric acid; the aqueous solution was spray-dried with the aid of a spray dryer and thus the precursor was obtained. The thus obtained precursor was calcined at 750° C. for 12 hours in an atmosphere of oxygen (supplied at a rate of 3 L/min), and thus $LiNi_{0.9}Mn_{0.1}O_2$ particles (powder) were obtained, which were used as the positive electrode active material.

Comparative Example 5

A lithium secondary battery was fabricated and the performance thereof was evaluated by following the same procedure as in Example 1 with the exception that the electrode material (the positive electrode active material) was prepared as described below. The evaluation results obtained are shown in Table 1.

[Preparation of Electrode Material (Positive Electrode Active Material)]

Lithium citrate, nickel nitrate and cobalt nitrate were weighed out in such a way that the relations Li/(Ni+Co)=1.0 (atomic ratio) and Ni/Co=90/10 (atomic ratio) were satisfied; then, these salts were dissolved in a 20 wt % aqueous solution of citric acid; the aqueous solution was spray-dried with the aid of a spray dryer and thus the precursor was obtained. The thus obtained precursor was calcined at 750° C. for 12 hours in an atmosphere of oxygen (supplied at a rate of 3 L/min), and thus $LiNi_{0.9}Co_{0.1}O_2$ particles (powder) were obtained, which were used as the positive electrode active material.

Comparative Example 6

A lithium secondary battery was fabricated and the performance thereof was evaluated by following the same procedure as in Example 1 with the exception that the electrode material (the positive electrode active material) was prepared as described below. The evaluation results obtained are shown in Table 1.

[Preparation of Electrode Material (Positive Electrode Active Material)]

Lithium citrate and cobalt nitrate were weighed out in such a way that the relation Li/Co=1.0 (atomic ratio) was satisfied; then, these salts were dissolved in a 20 wt % aqueous solution of citric acid; the aqueous solution was spray-dried with the aid of a spray dryer and thus the precursor was obtained. The obtained precursor was calcined at 800° C. for 12 hours in an atmosphere of oxygen (supplied at a rate of 3 L/min), and thus LiCoO$_2$ particles (powder) were obtained, which were used as the positive electrode active material.

Comparative Example 7

A lithium secondary battery was fabricated and the performance thereof was evaluated by following the same procedure as in Example 1 with the exception that the electrode material (the positive electrode active material) was prepared as described below. The evaluation results obtained are shown in Table 1.

[Preparation of Electrode Material (Positive Electrode Active Material)]

In the same manner as that in Comparative Example 6, the LiCoO$_2$ forming the central portion was prepared. Then, there was formed LiCo$_{0.9}$Al$_{0.1}$O$_2$ as the surface portion covering the LiCoO$_2$ particle (hereinafter referred to as "central portion particle"). More specifically, lithium nitrate, cobalt nitrate and aluminum nitrate (Al(NO$_3$)$_3$) were dissolved in ethanol in such a way that the relations Li/(Co+Al)=1.0 (atomic ratio) and Co/Al=90/10 (atomic ratio) were satisfied; the above-described central portion particle material was dispersed in the ethanol solution in such a way that the relation (Co+Al)$_{surface\ portion}$/Co$_{central\ portion}$=0.03 (atomic ratio) was satisfied; then, the ethanol was evaporated with the aid of a rotary evaporator, and thus the precursor was obtained in which the lithium salt, cobalt salt and aluminum salt were physically adhered to the surface of the above-described central portion particles. The thus obtained precursor was calcined at 500° C. for 3 hours in an atmosphere of oxygen and thus the positive electrode active material particles (powder) were obtained.

Comparative Example 8

A lithium secondary battery was fabricated and the performance thereof was evaluated by following the same procedure as in Example 1 with the exception that the electrode material (the positive electrode active material) was prepared as described below. The evaluation results obtained are shown in Table 1.

[Preparation of Electrode Material (Positive Electrode Active Material)]

Lithium citrate, cobalt nitrate and tetraethoxytitanium (Ti(OC$_2$H$_5$)$_4$) were weighed out in such a way that the relations Li/(Co+Ti)=1.0 (atomic ratio) and Co/Ti=97.5/2.5 (atomic ratio) were satisfied; then, the lithium citrate and cobalt nitrate were dissolved in a 20 wt % aqueous solution of citric acid; while the aqueous solution was heated to 60° C. and was being stirred, the tetraethoxytitanium (Ti(OC$_2$H$_5$)$_4$) was added to the aqueous solution, and thereafter the aqueous solution thus obtained was spray-dried with the aid of a spray dryer and thus the precursor was obtained. The obtained precursor was calcined at 800° C. for 12 hours in an atmosphere of oxygen (supplied at a rate of 3 L/min), and thus LiCo$_{0.975}$Ti$_{0.025}$O$_2$ particles (powder) were obtained, which were used as the positive electrode active material.

Comparative Example 9

A lithium secondary battery was fabricated and the performance thereof was evaluated by following the same procedure as in Example 1 with the exception that the electrode material (the positive electrode active material) was prepared as described below. The evaluation results obtained are shown in Table 1.

[Preparation of Electrode Material (Positive Electrode Active Material)]

Lithium citrate, cobalt nitrate and aluminum nitrate (Al(NO$_3$)$_3$) were weighed out in such a way that the relations Li/(Co+Al)=1.0 (atomic ratio) and Co/Al=97.5/2.5 (atomic ratio) were satisfied; then, these salts were dissolved in a 20 wt % aqueous solution of citric acid; the aqueous solution was spray-dried with the aid of a spray dryer and thus the precursor was obtained. The thus obtained precursor was calcined at 800° C. for 12 hours in an atmosphere of oxygen (supplied at a rate of 3 L/min), and thus LiCo$_{0.975}$Al$_{0.025}$O$_2$ particles (powder) were obtained, which were used as the positive electrode active material.

Comparative Example 10

A lithium secondary battery was fabricated and the performance thereof was evaluated by following the same procedure as in Example 1 with the exception that the electrode material (the positive electrode active material) was prepared as described below. The evaluation results obtained are shown in Table 1.

[Preparation of Electrode Material (Positive Electrode Active Material)]

Lithium citrate, cobalt nitrate and manganese nitrate were weighed out in such a way that the relations Li/(Co+Mn)=1.06 (atomic ratio) and Co/Mn=97.5/2.5 (atomic ratio) were satisfied; then, these salts were dissolved in a 20 wt % aqueous solution of citric acid; the aqueous solution was spray-dried with the aid of a spray dryer and thus the precursor was obtained. The thus obtained precursor was calcined at 800° C. for 12 hours in an atmosphere of oxygen (supplied at a rate of 3 L/min), and thus LiCo$_{0.975}$Mn$_{0.025}$O$_2$ particles (powder) were obtained, which were used as the positive electrode active material.

Comparative Example 11

A lithium secondary battery was fabricated in the same manners as that in Example 1 with the exception that the electrode material (the positive electrode active material) was prepared as described below.

[Preparation of Electrode Material (Positive Electrode Active Material)]

Lithium citrate, cobalt nitrate and nickel nitrate were weighed out in such a way that the relations Li/(Co+Ni)=1.06 (atomic ratio) and Co/Ni=90/10 (atomic ratio) were satisfied; then, these salts were dissolved in a 20 wt % aqueous solution of citric acid; the aqueous solution was spray-dried with the aid of a spray dryer and thus the precursor was obtained. The obtained precursor was calcined at 800° C. for 12 hours in an atmosphere of oxygen (supplied at a rate of 3 L/min), and thus LiCo$_{0.9}$Ni$_{0.1}$O$_2$ particles (powder) were obtained, which were used as the positive electrode active material.

TABLE 1

|  | Main constituent of central portion | Main constituent of surface portion | 25° C. (Room Temp.) | | 60° C. | |
|---|---|---|---|---|---|---|
|  |  |  | Initial discharge capacity [mAh/g] | Capacity retention ratio at 150th cycle [%] | Initial discharge capacity [mAh/g] | Capacity retention ratio at 150th cycle [%] |
| Example 1 | $LiNi_{0.975}Ti_{0.025}O_2$ | $LiNi_{0.9}V_{0.1}O_2$ | 200 | 95 | 190 | 85 |
| Example 2 | $LiNi_{0.975}Ti_{0.025}O_2$ | $LiNi_{0.9}Si_{0.1}O_2$ | 195 | 94 | 185 | 83 |
| Example 3 | $LiNi_{0.9}Mn_{0.1}O_2$ | $LiNi_{0.9}Ti_{0.1}O_2$ | 190 | 94 | 180 | 84 |
| Example 4 | $LiNi_{0.9}Co_{0.1}O_2$ | $LiNi_{0.9}V_{0.1}O_2$ | 193 | 95 | 182 | 82 |
| Example 5 | $LiCo_{0.975}Ti_{0.025}O_2$ | $LiCo_{0.9}Al_{0.1}O_2$ | 150 | 98 | 145 | 90 |
| Example 6 | $LiCo_{0.975}Ti_{0.025}O_2$ | $LiCo_{0.9}Mg_{0.1}O_2$ | 150 | 97 | 145 | 90 |
| Example 7 | $LiCo_{0.975}Al_{0.025}O_2$ | $LiCo_{0.9}Mg_{0.1}O_2$ | 155 | 98 | 150 | 92 |
| Example 8 | $LiCo_{0.975}Mn_{0.025}O_2$ | $LiCo_{0.9}Al_{0.1}O_2$ | 150 | 95 | 145 | 90 |
| Example 9 | $LiCo_{0.9}Ni_{0.1}O_2$ | $LiCo_{0.9}Al_{0.1}O_2$ | 150 | 92 | 145 | 88 |
| Comparative Example 1 | $LiNiO_2$ | — | 200 | 70 | 190 | 60 |
| Comparative Example 2 | $LiNiO_2$ | $LiNi_{0.9}V_{0.1}O_2$ | 200 | 75 | 190 | 66 |
| Comparative Example 3 | $LiNi_{0.975}Ti_{0.025}O_2$ | — | 200 | 85 | 190 | 75 |
| Comparative Example 4 | $LiNi_{0.9}Mn_{0.1}O_2$ | — | 190 | 75 | 180 | 65 |
| Comparative Example 5 | $LiNi_{0.9}Co_{0.1}O_2$ | — | 193 | 80 | 175 | 77 |
| Comparative Example 6 | $LiCoO_2$ | — | 160 | 90 | 145 | 75 |
| Comparative Example 7 | $LiCoO_2$ | $LiCo_{0.9}Al_{0.1}O_2$ | 150 | 88 | 140 | 80 |
| Comparative Example 8 | $LiCo_{0.975}Ti_{0.025}O_2$ | — | 145 | 85 | 140 | 70 |
| Comparative Example 9 | $LiCo_{0.975}Al_{0.025}O_2$ | — | 150 | 90 | 142 | 75 |
| Comparative Example 10 | $LiCo_{0.975}Mn_{0.025}O_2$ | — | 155 | 88 | 145 | 65 |
| Comparative Example 11 | $LiCo_{0.9}Ni_{0.1}O_2$ | — | 150 | 88 | 142 | 70 |

As described above, according to the preferred examples of the present invention, an electrode material (positive electrode active material) in which the bonding between a transition metal and oxygen at the surface of particles is strong, the high-temperature storage characteristic is excellent, and the cyclic characteristic is high can be attained, whereby a lithium secondary battery having an excellent storage characteristic, a large energy density and a high cyclic characteristic can be provided.

What is claimed is:

1. A propriety judging method of judging the propriety of a positive electrode active material for use as a positive electrode active material of a lithium secondary battery, the active material comprising particles each having a configuration comprising a central portion and a surface portion covering the surface of the central portion, the method comprising the steps of:

constructing a particular atomic aggregate model that hypothetically represents a positive electrode active material particle in which the central portion is constituted of $LiM_{1-a}D_aO_2$ (M represents Co or Ni, D represents a transition metal element or Al replacing a part of Co or Ni as M, and M is not the same as D) having an α-NaFeO$_2$ structure, a region between the outer surface of the central portion and the outermost surface of the particle is occupied by the surface portion, the surface portion is constituted of $LiM_{1-b}E_bO_2$ (M represents Co or Ni, E represents a metal element replacing a part of Co or Ni as M, and M is not the same as E) having an α-NaFeO$_2$ structure, and the species of replacing element D and the value a of the central portion differ from the species of replacing element E and the value b of the surface portion, respectively;

evaluating the bonding force between M and O atoms in the surface portion by use of the density functional method as a technique for solving the Schroedinger's wave equation governing the motion of electrons, thereby predicting the possibility of addition of elements D and E; and judging the propriety of the positive electrode active material on the basis of the prediction.

2. The propriety judging method of judging the propriety of a positive electrode active material according to claim 1, wherein element M of $LiM_{1-a}D_aO_2$ of the central portion and of $LiM_{1-b}E_bO_2$ of the surface portion is Co; replacing element D of the central portion comprises at least one selected from the group consisting of Al, Ti, Ni, and Mn; and replacing element E of the surface portion comprises at least one selected from the group consisting of the elements belonging to Groups 2 and 13 of the periodic table.

3. The propriety judging method of judging the propriety of a positive electrode active material according to claim 1, wherein element M of $LiM_{1-a}D_aO_2$ of the central portion and of $LiM_{1-b}E_bO_2$ of the surface portion is Co; replacing element D of the central portion comprises at least one selected from the group consisting of Al, Mn, Ti, and Ni; and replacing element E of the surface portion comprises at least one of Al and Mg.

4. The propriety judging method of judging the propriety of a positive electrode active material according to claim 1, wherein element M of $LiM_{1-a}D_aO_2$ of the central portion and of $LiM_{1-b}E_bO_2$ of the surface portion is Ni; replacing element D of the central portion comprises at least one selected from the group consisting of Ti, Co, and Mn; and replacing element E of the surface portion comprises at least one selected from the group consisting of the elements belonging to Groups 4, 5 and 14 of the periodic table.

5. The propriety judging method of judging the propriety of a positive electrode active material according to claim 1, wherein element M of $LiM_{1-a}D_aO_2$ of the central portion and of $LiM_{1-b}E_bO_2$ of the surface portion is Ni; replacing element D of the central portion comprises at least one selected from the group consisting of Ti, Co, and Mn; and replacing element E of the surface portion comprises at least one of V and Si.

* * * * *